M. J. MILMOE.
BOX COVER SHELL MAKING MACHINE.
APPLICATION FILED APR. 10, 1915.
1,244,066.
Patented Oct. 23, 1917.
18 SHEETS—SHEET 6.
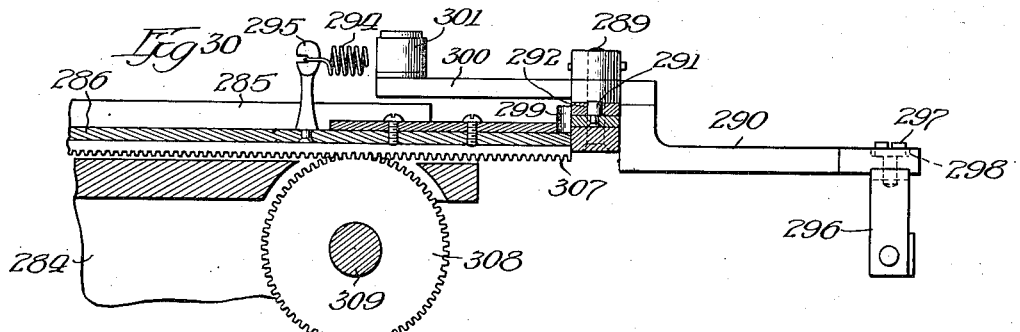
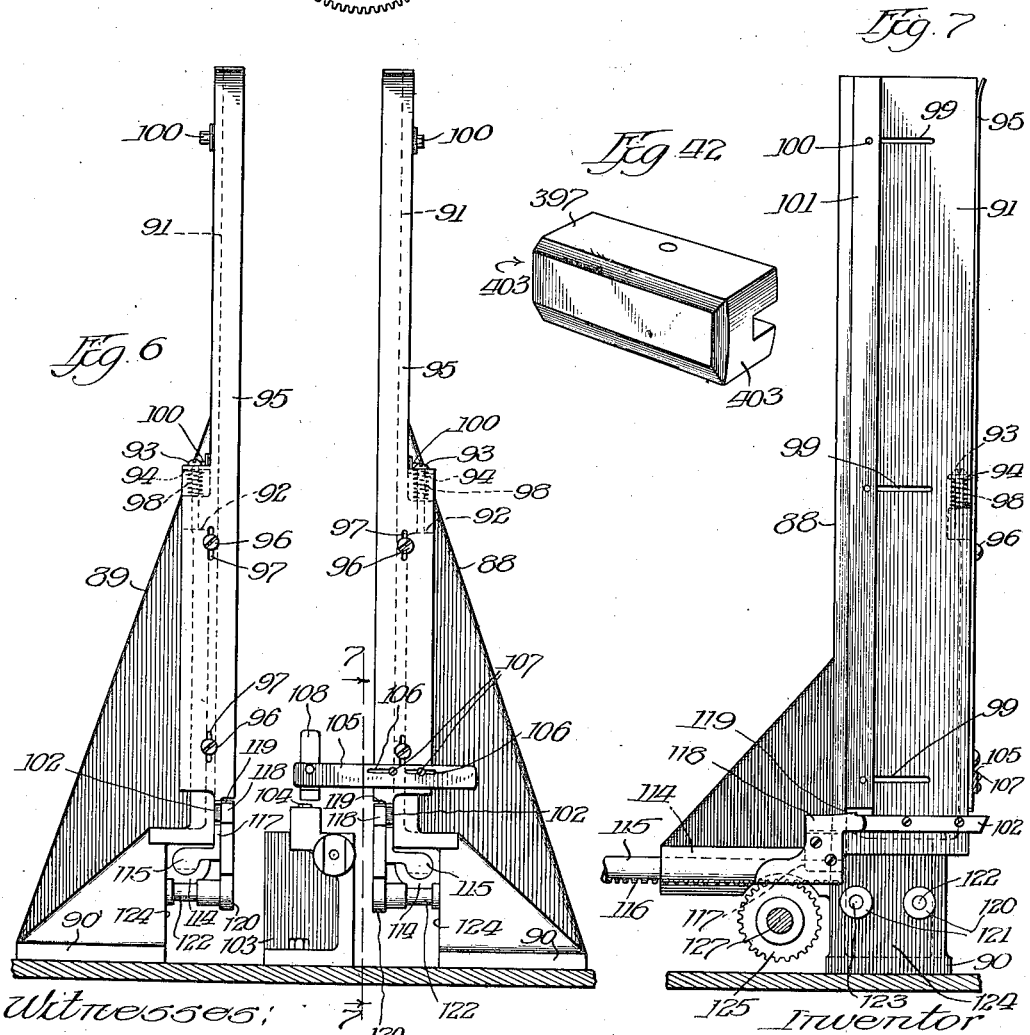

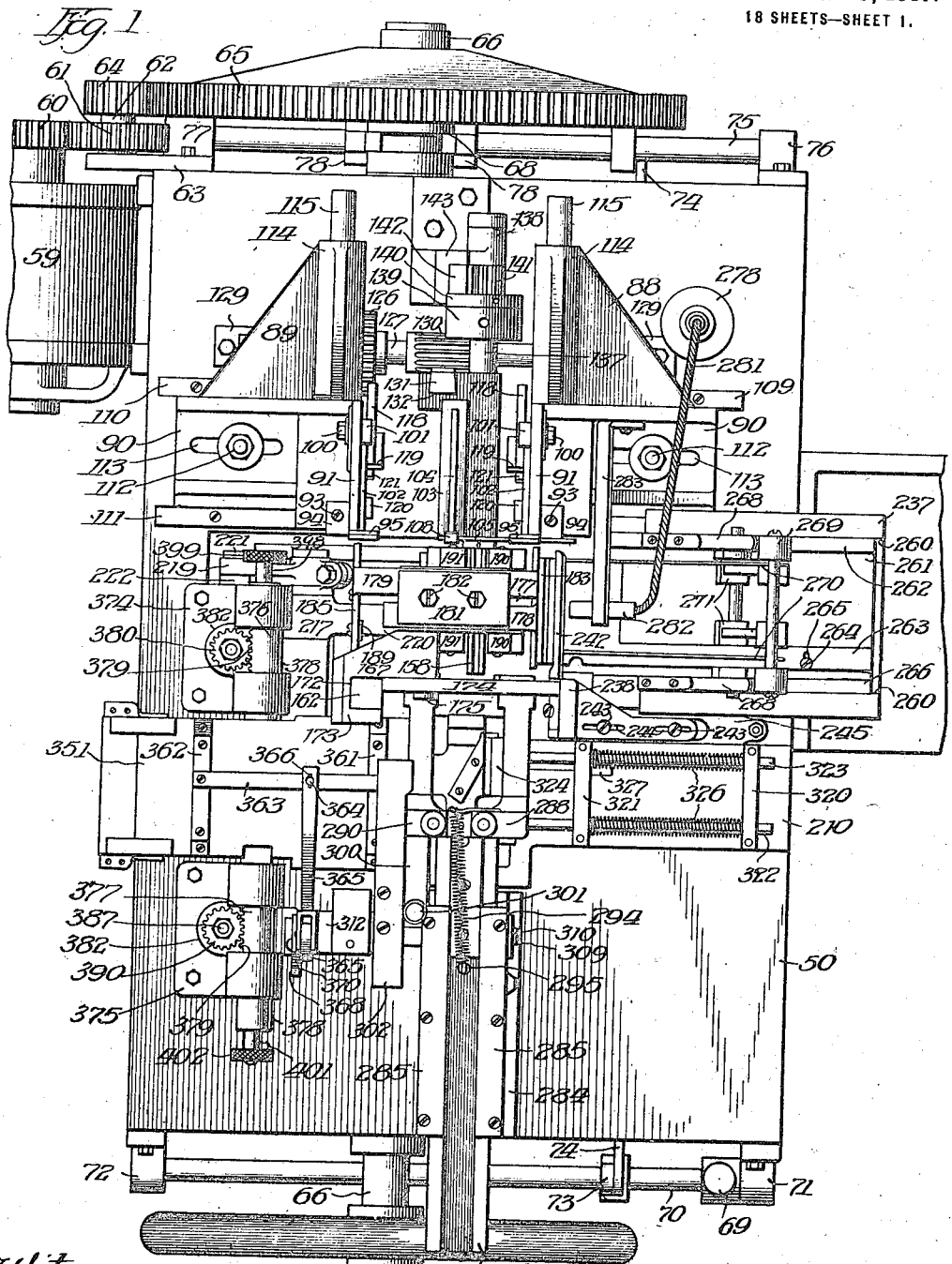

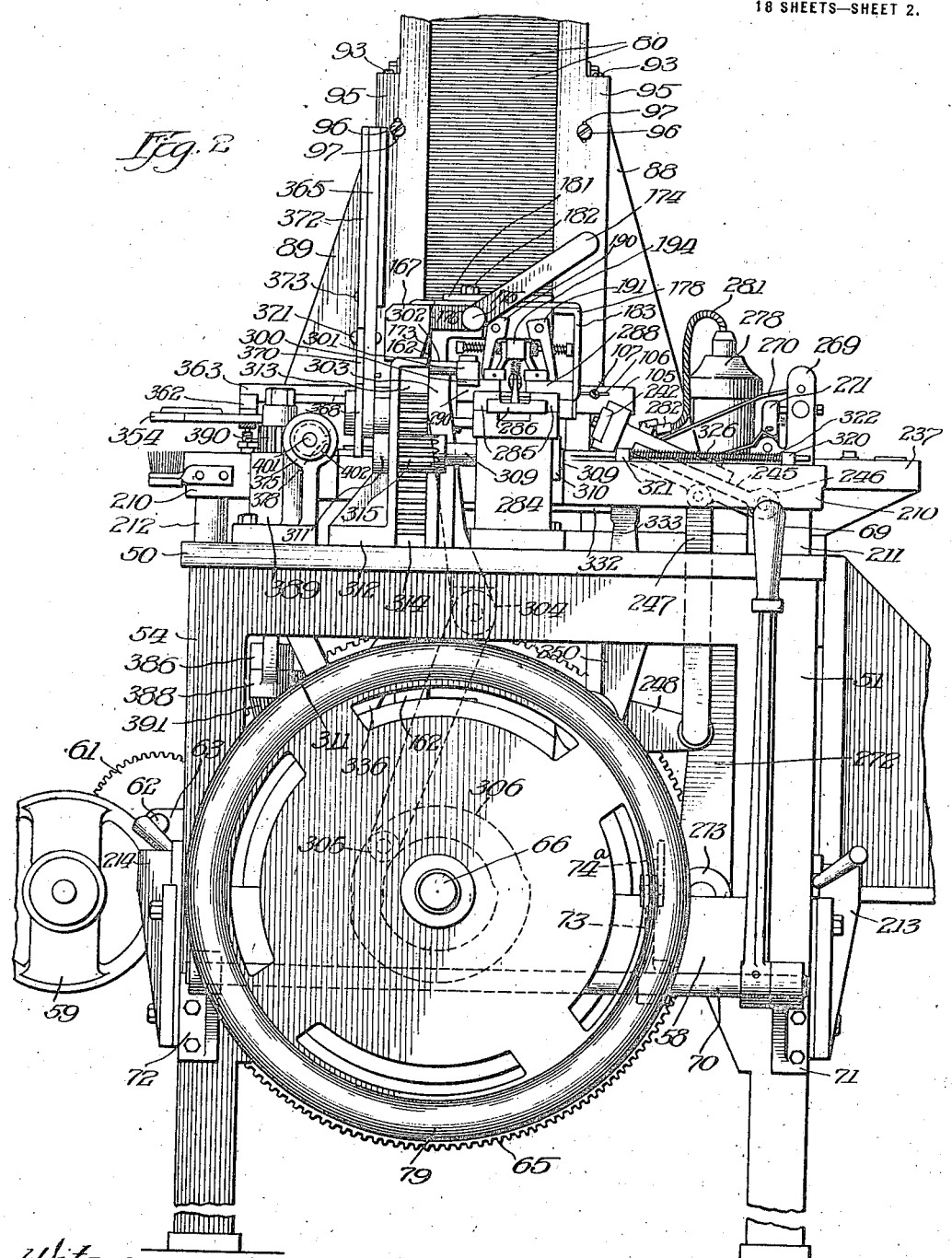

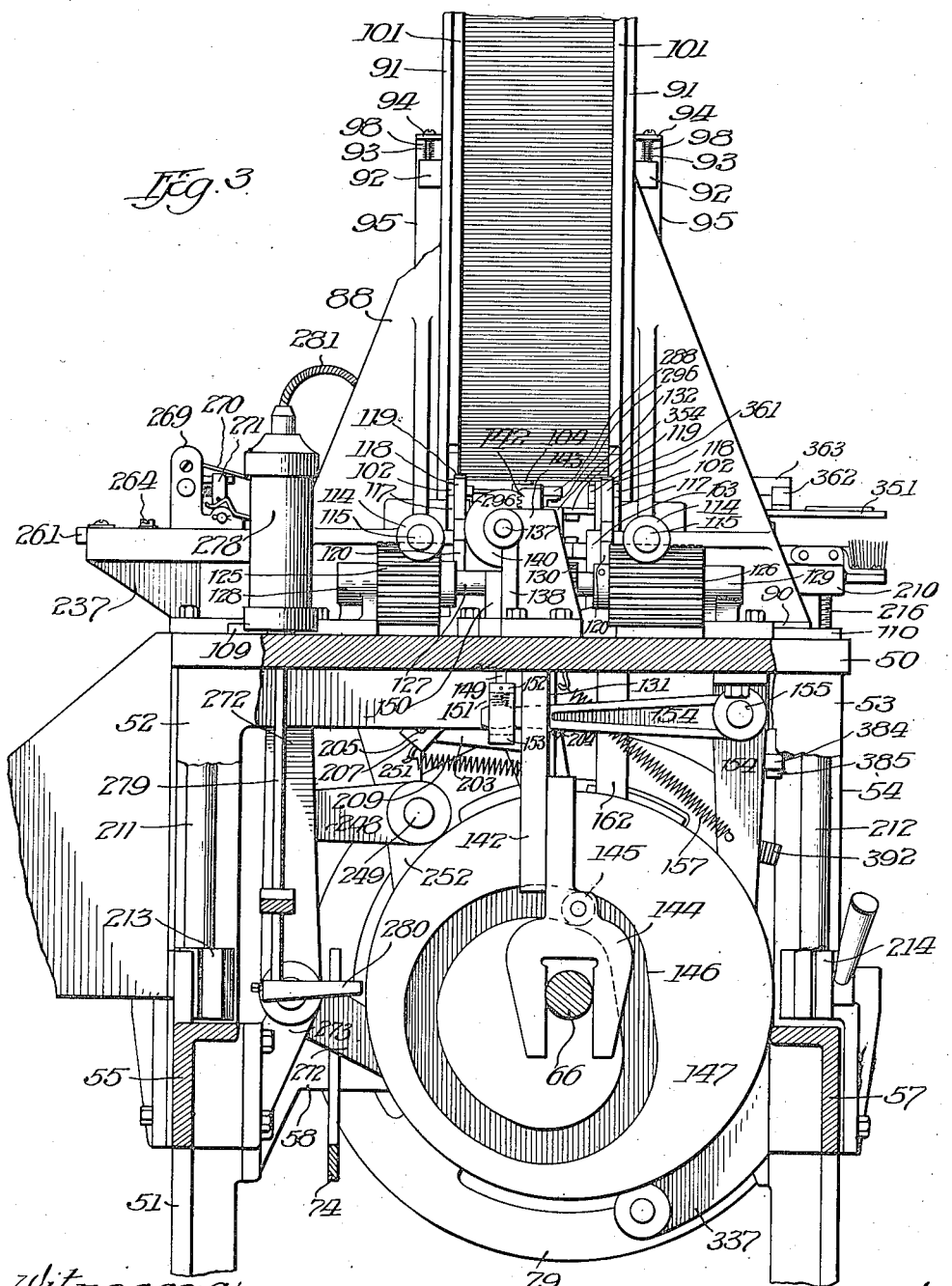

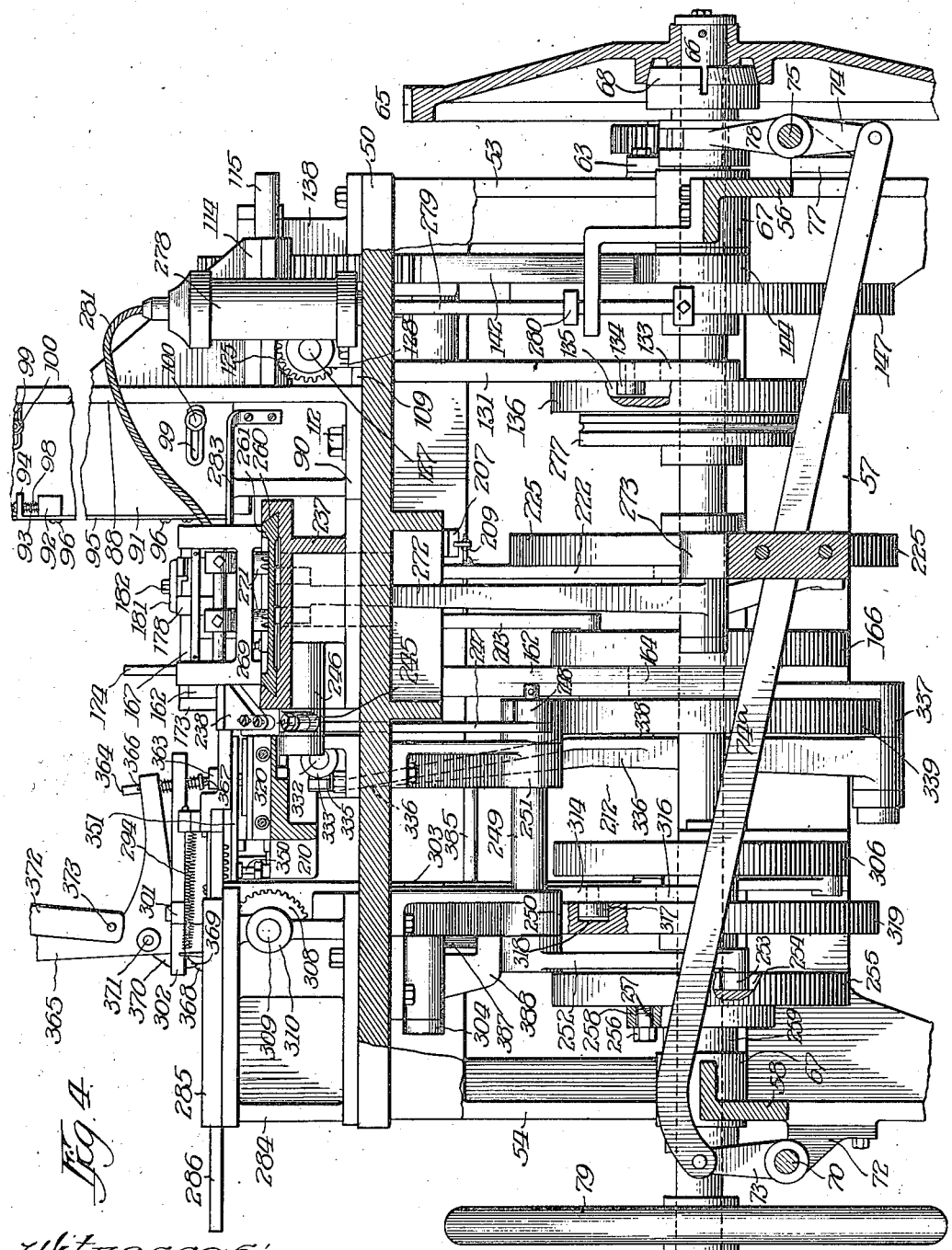

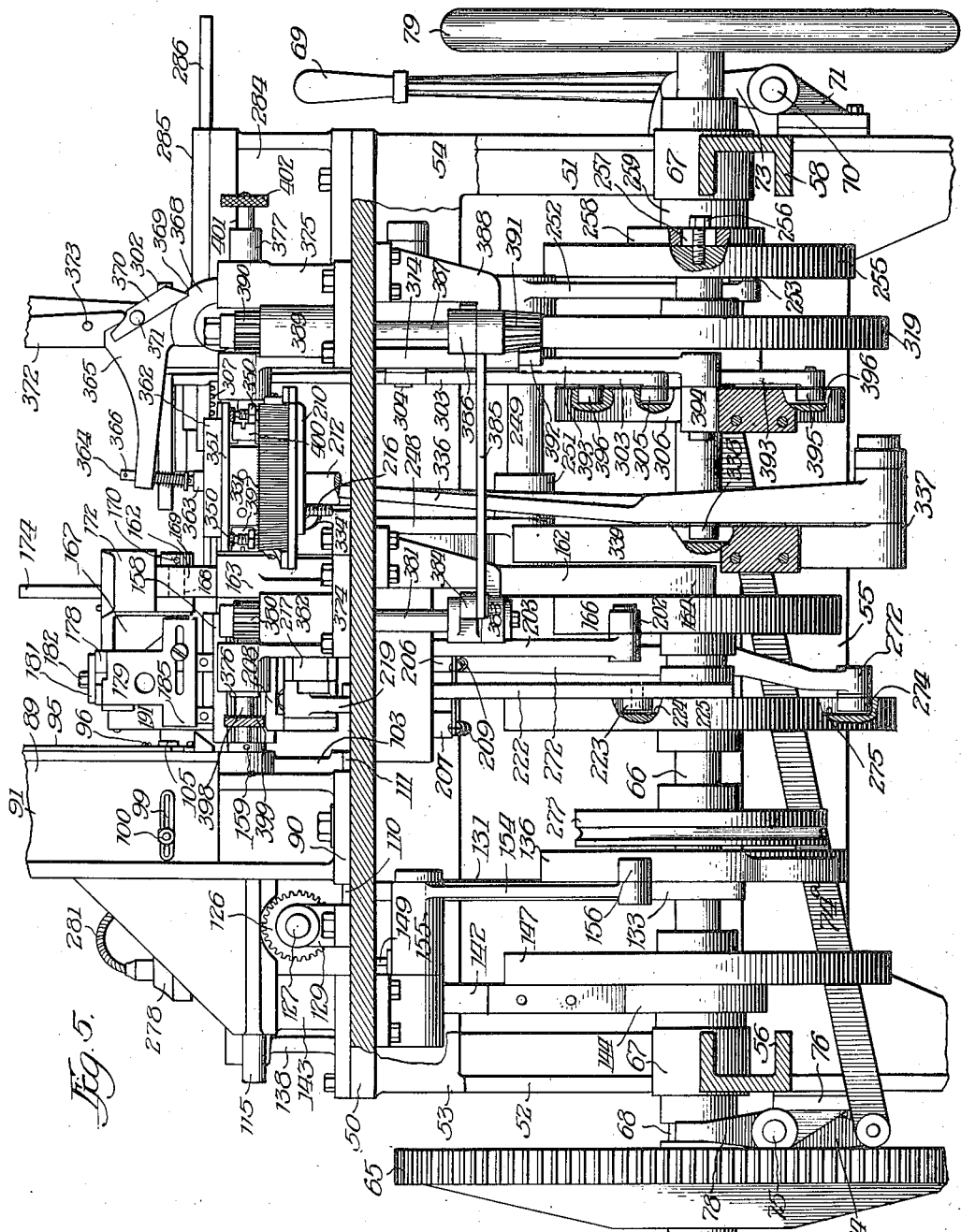

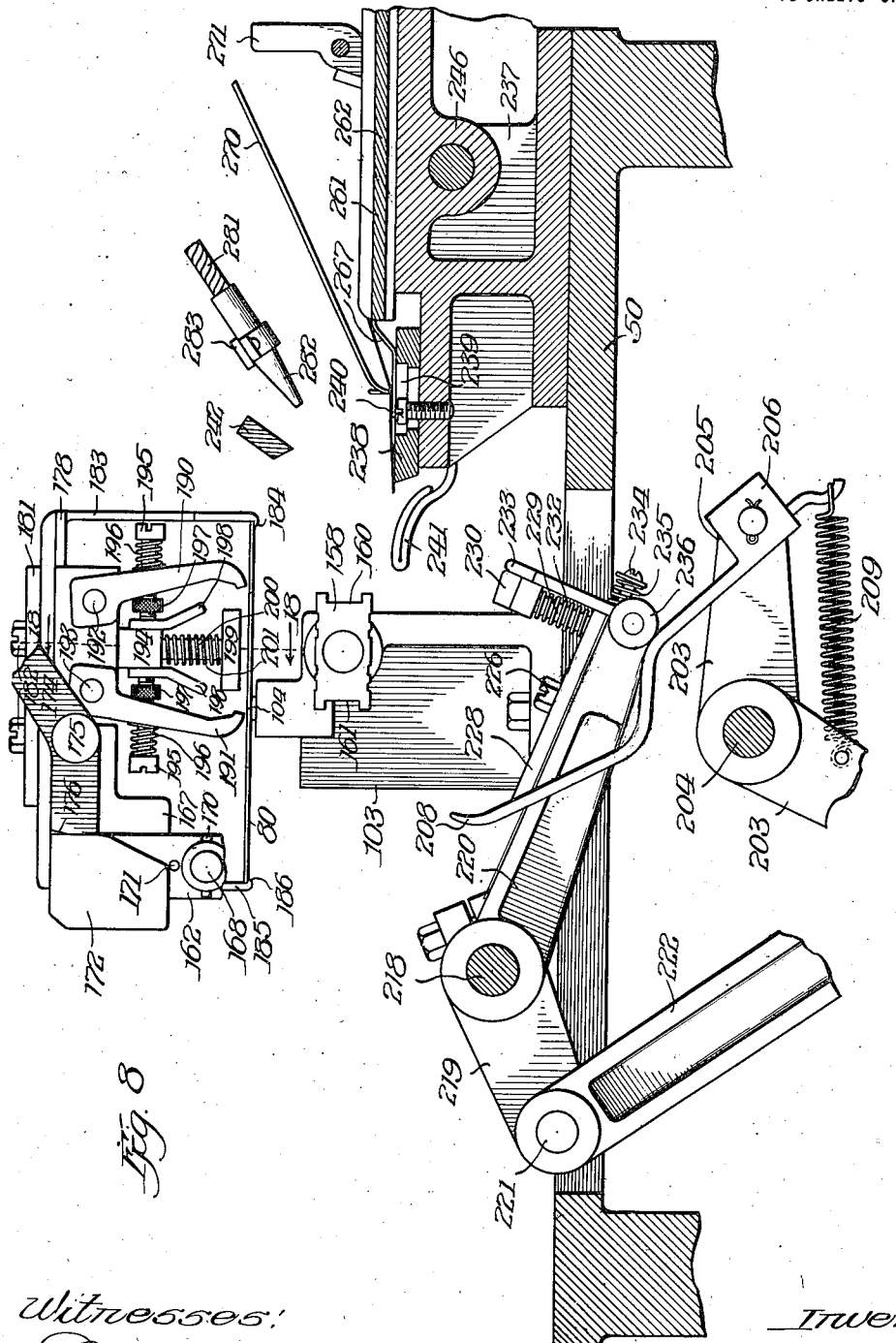

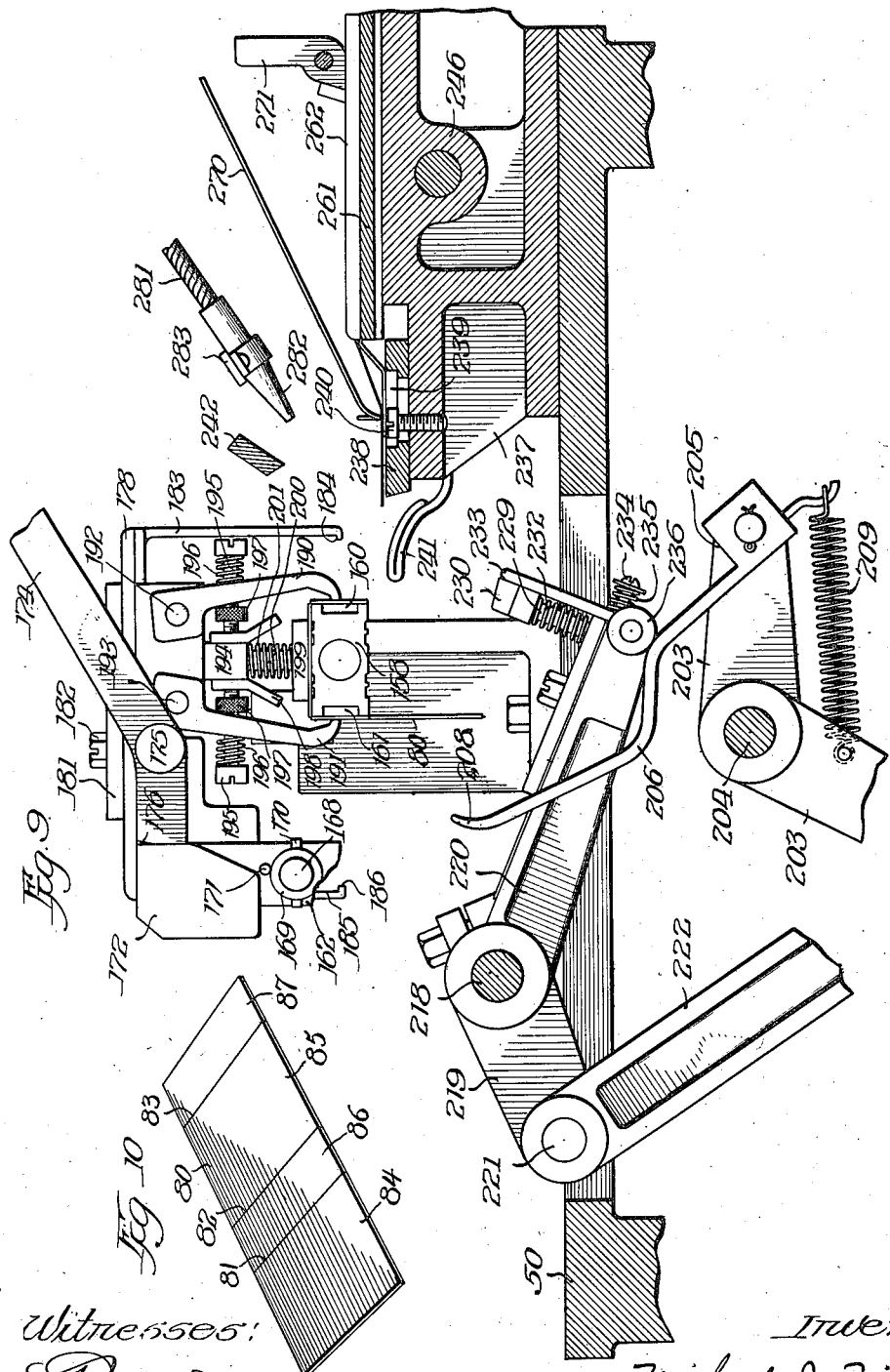

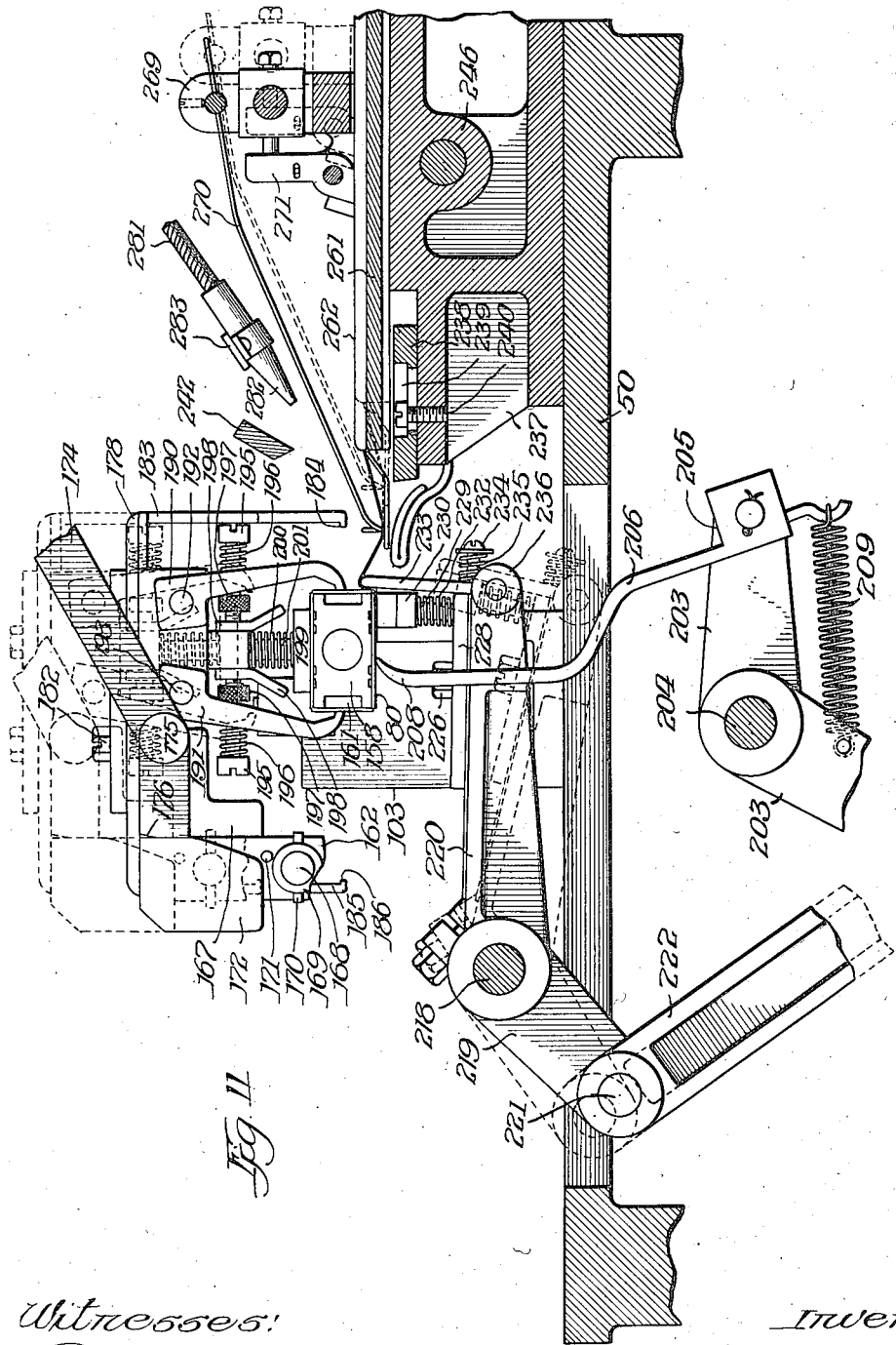

M. J. MILMOE.
BOX COVER SHELL MAKING MACHINE.
APPLICATION FILED APR. 10, 1915.
1,244,066.
Patented Oct. 23, 1917.
18 SHEETS—SHEET 10.
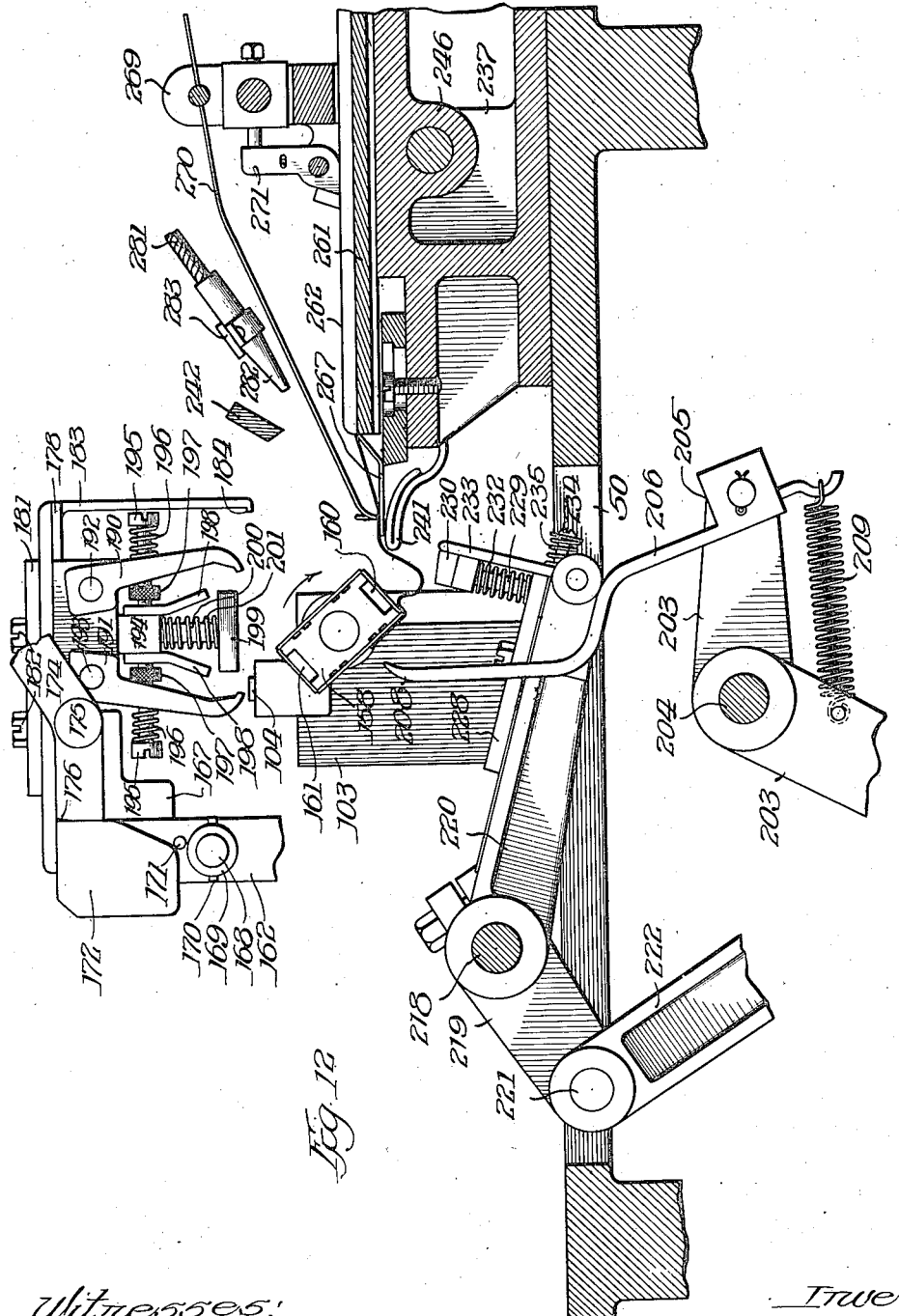

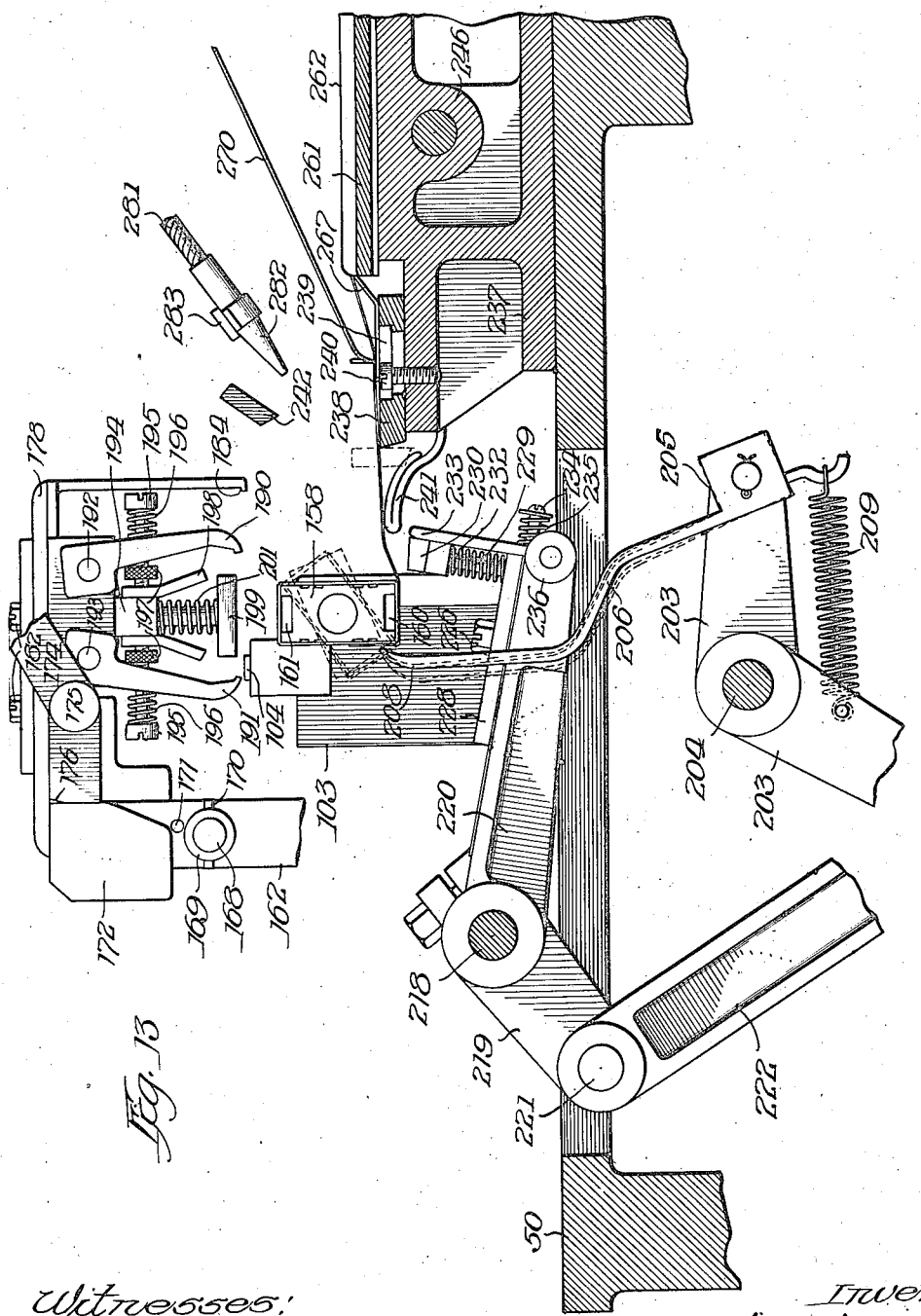

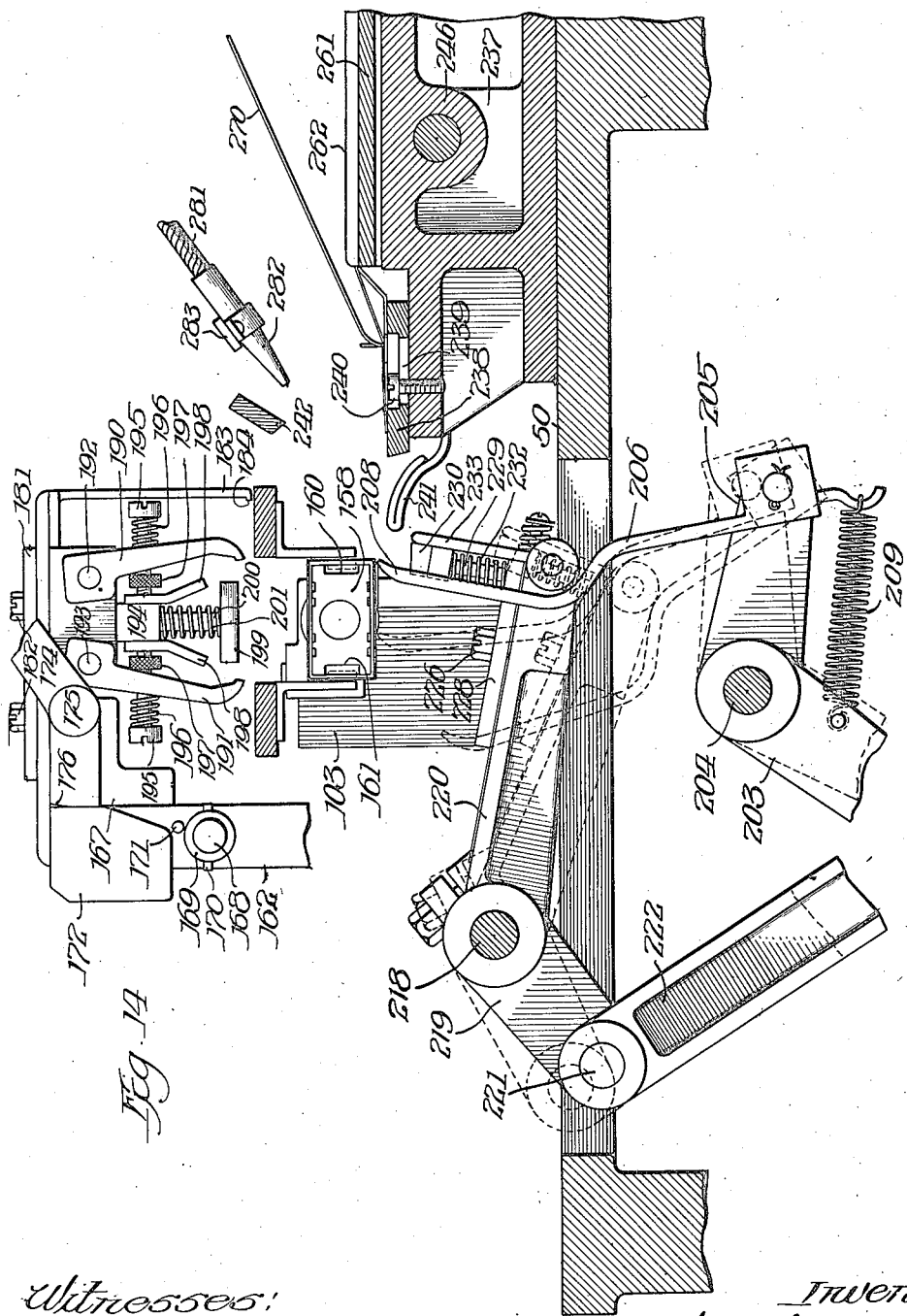

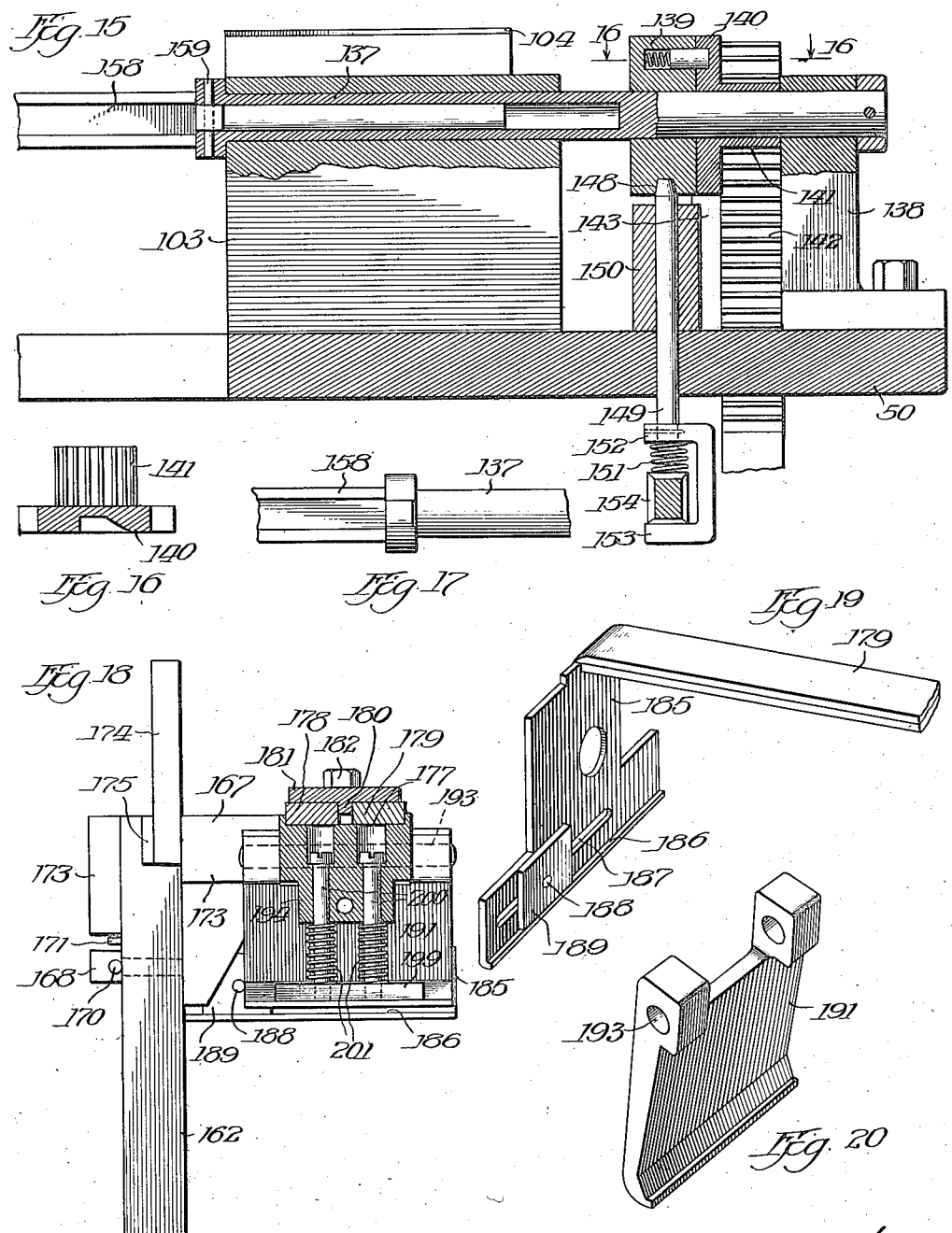

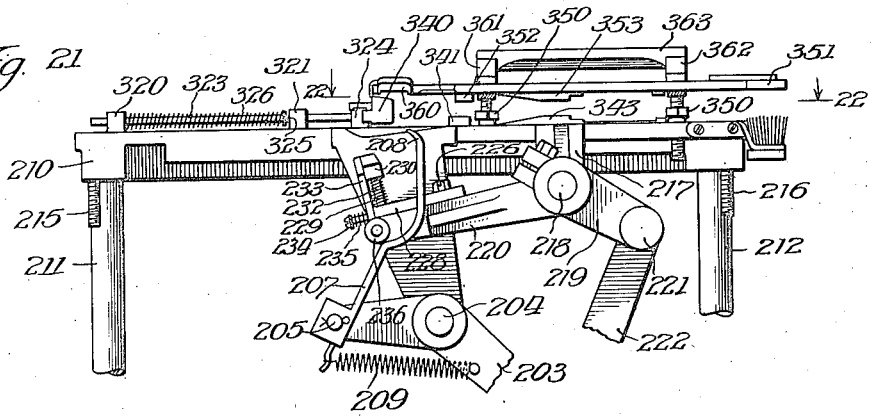

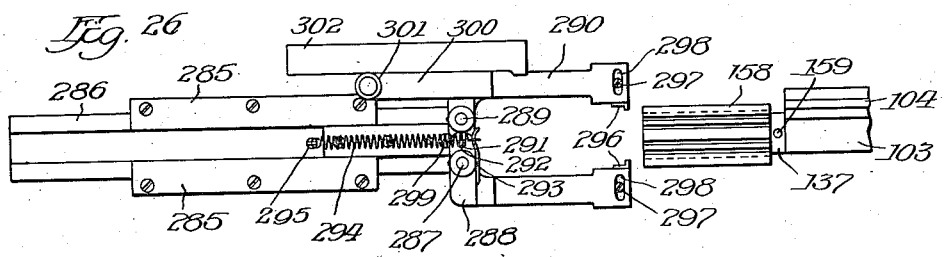
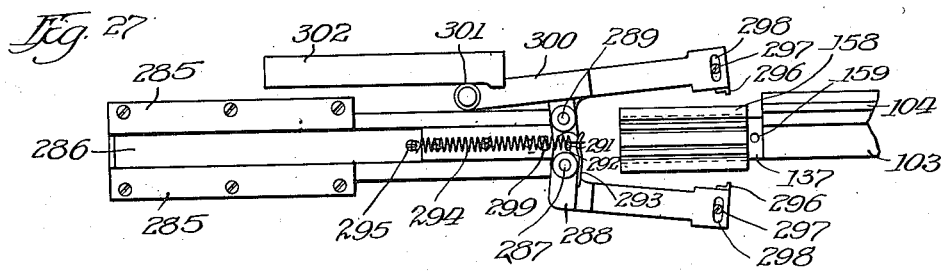
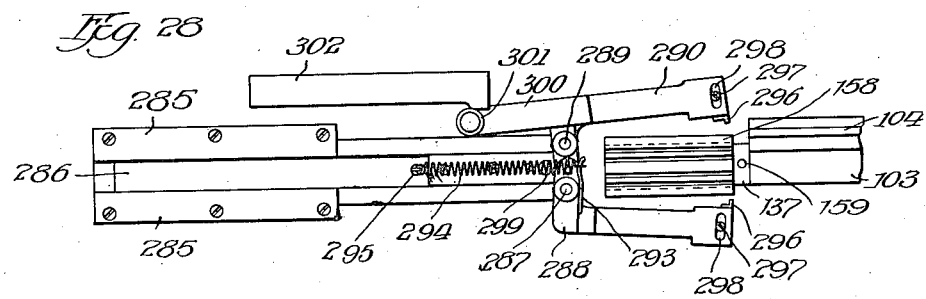
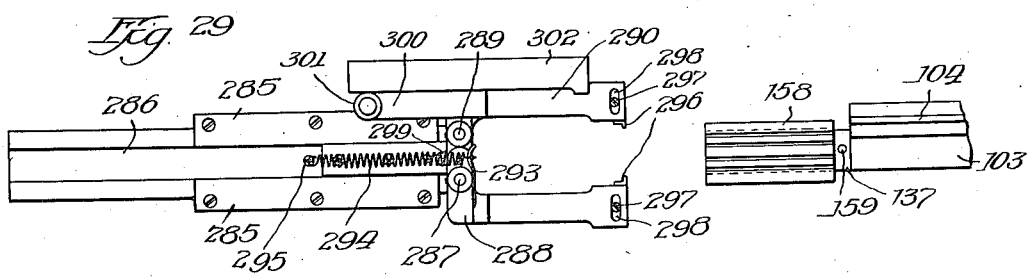

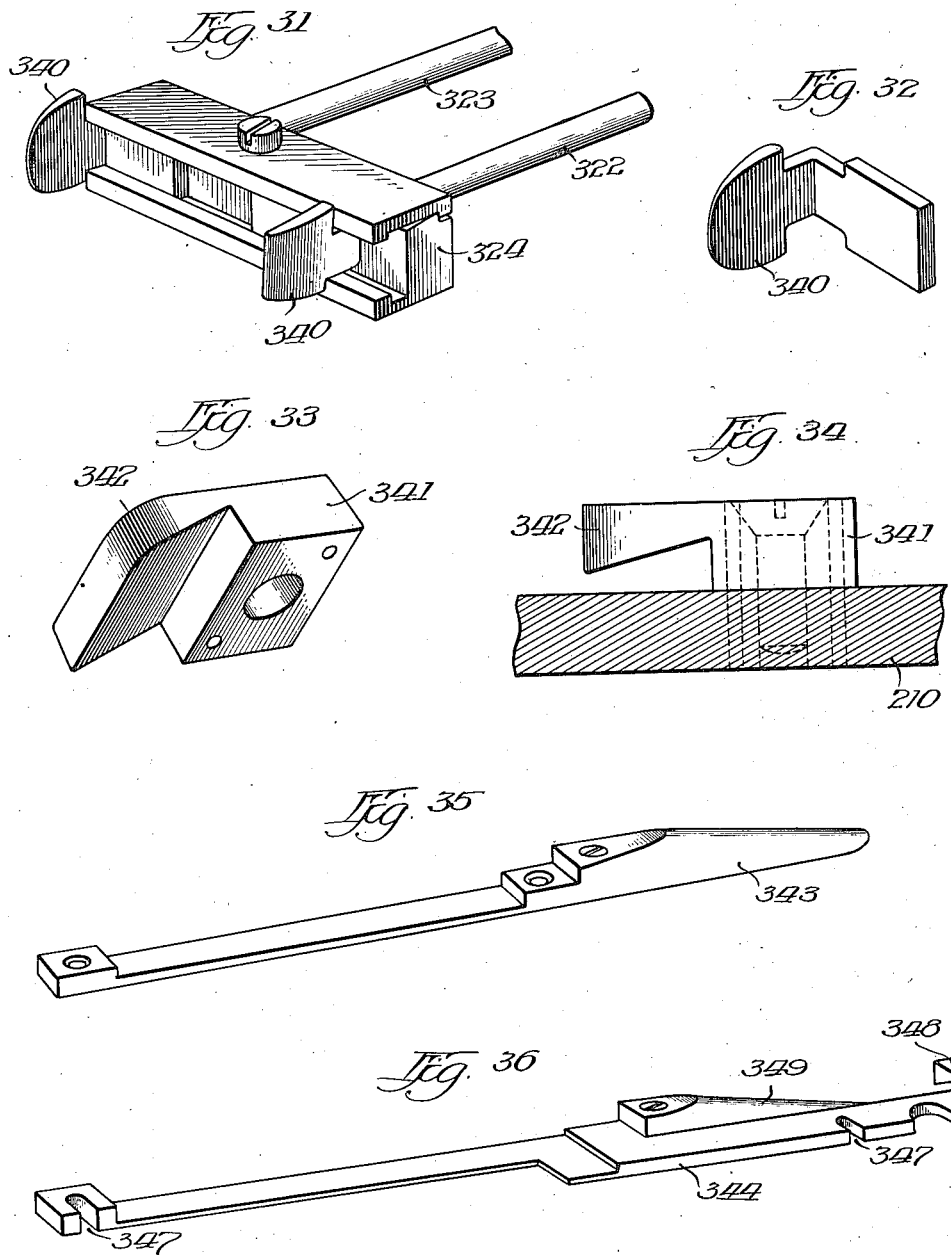

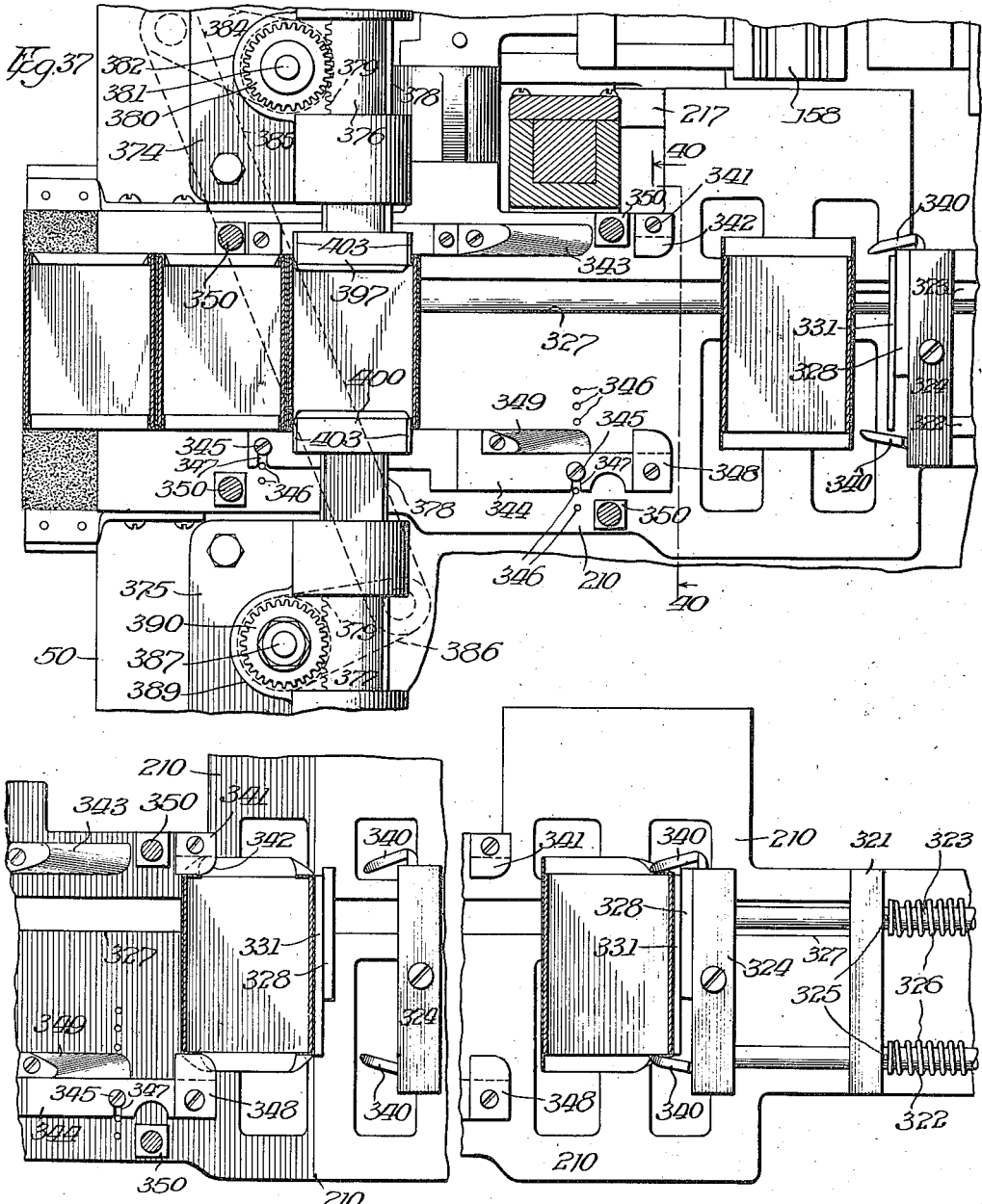

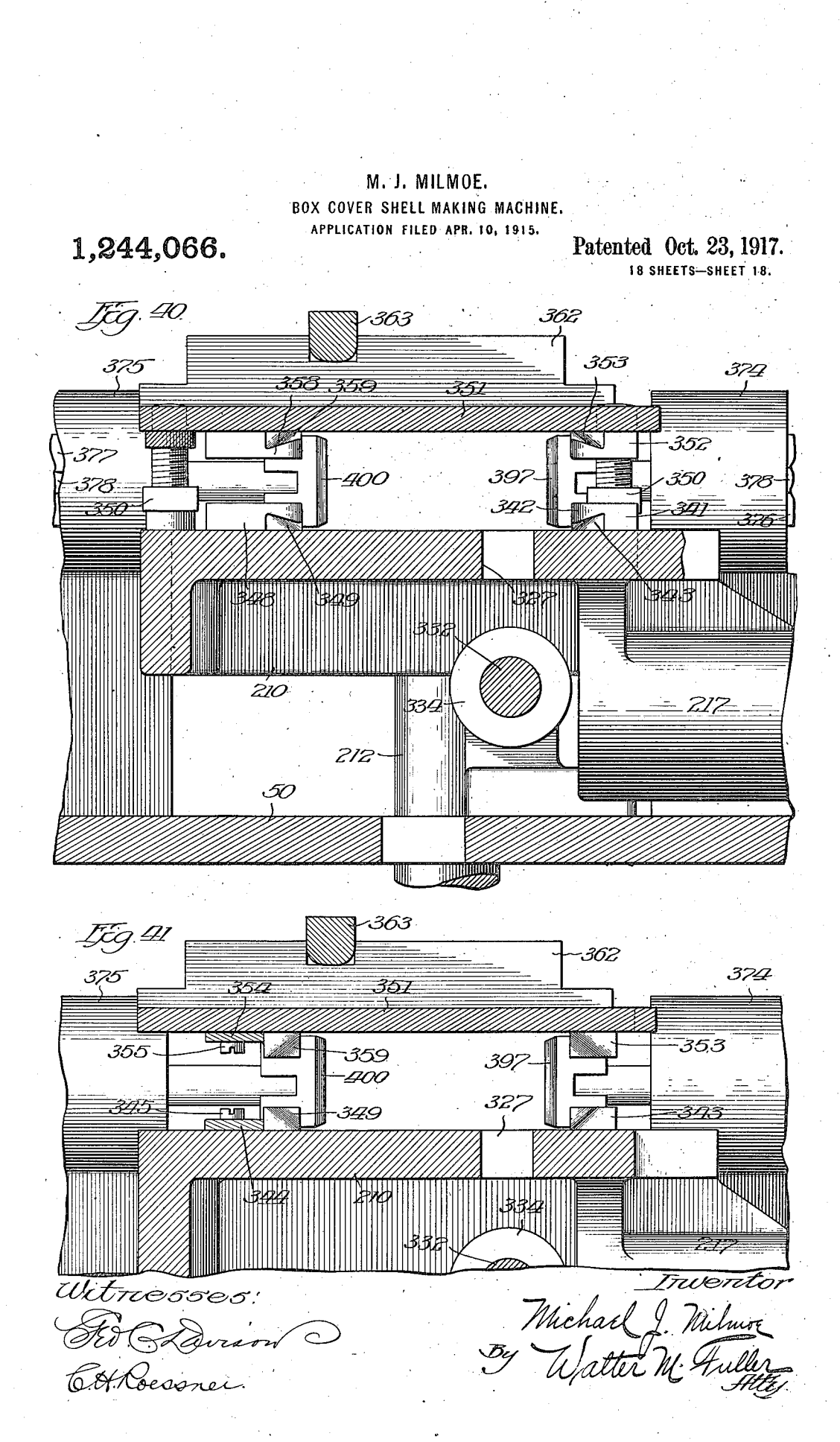

M. J. MILMOE.
BOX COVER SHELL MAKING MACHINE.
APPLICATION FILED APR. 10, 1915.

1,244,066.

Patented Oct. 23, 1917.
18 SHEETS—SHEET 18.

UNITED STATES PATENT OFFICE.

MICHAEL J. MILMOE, OF CHICAGO, ILLINOIS, ASSIGNOR TO W. C. RITCHIE & COMPANY, OF CHICAGO, ILLINOIS, A CORPORATION OF ILLINOIS.

BOX-COVER-SHELL-MAKING MACHINE.

1,244,066.   Specification of Letters Patent.   Patented Oct. 23, 1917.

Application filed April 10, 1915. Serial No. 20,501.

*To all whom it may concern:*

Be it known that I, MICHAEL J. MILMOE, a citizen of the United States, residing at Chicago, in the county of Cook and State of Illinois, have invented certain new and useful Improvements in Box-Cover-Shell-Making Machines, of which the following is a specification.

This invention relates to improvements and features of novelty in machines for manufacturing parts of pasteboard or similar boxes, and concerns more particularly machines employed for the production of pasteboard slides or shells, by which terms are meant the slide covers for pasteboard boxes or trays such covers being open at both ends and adapted to receive within them the body portion of the box.

One of the leading aims of the invention is the provision of a machine of this kind which will rapidly and economically produce box-slides or covers of this character with a covering of finishing material applied to them and folded into their open ends. A further feature of the invention resides in the production of a machine of this character, the parts of which may be adjusted for the manufacture of box-slides or shells of different sizes.

To those skilled in this art, other features of advantage accruing from a machine incorporating the invention will become apparent from a consideration of the following detailed description of a desirable embodiment of the invention, which is illustrated in the accompanying drawings forming a part of this specification, and throughout the various views of which like reference characters refer to the same parts.

Figure 1 is a plan view of the machine with certain parts broken away;

Fig. 2 is a front elevation with parts broken away;

Fig. 3 is a similar rear elevation;

Fig. 4 is a partial elevation and partial section of the machine as viewed from the right-hand side;

Fig. 5 is a similar view from the left-hand side;

Fig. 6 is a front elevation of the blank magazine;

Fig. 7 is a vertical section on line 7—7 of Fig. 6;

Fig. 8 illustrates in section and elevation the paper feed, and the form and associated folding mechanism before the pasteboard blank is applied to the form;

Fig. 9 shows the same parts after the blank has been partly bent around the form;

Fig. 10 indicates the blank in perspective;

Fig. 11 illustrates the relations of the structural elements after the blank has been completely folded about the form and the advance end of the wider paper strip has been applied to the shell;

Fig. 12 shows the same parts as the form begins its revolution;

Fig. 13 indicates the further rotation of the form;

Fig. 14 shows the positions of the parts after the shell is covered with the paper and the ends of the latter overlapped thereon;

Fig. 15 is a vertical section showing the form shaft and its operating and locking mechanisms;

Fig. 16 is a section of the clutch pinion shown in Fig. 15 on line 16—16 of Fig. 15;

Fig. 17 illustrates in detail the manner of attaching the form to its shaft;

Fig. 18 is a vertical section through the blank carrier on line 18—18 of Fig. 8;

Fig. 19 shows in perspective one of the supporting members of the carrier for the blank;

Fig. 20 illustrates in perspective one of the hinged blank folders of the carrier;

Fig. 21 is a side view of the supplemental table and the parts associated therewith;

Fig. 22 is a plan of the part of the machine shown in Fig. 21;

Figs. 23 and 24 are elevations of that part of the mechanism which applies the advance end of the covering-paper to the folded blank;

Fig. 25 is a perspective view of one of the rocker-arms;

Figs. 26, 27, 28, and 29 show the form and different positions which the stripper mechanism assumes with relation to it;

Fig. 30 illustrates the operating-mechanism for the stripper;

Figs. 31, 32, 33, 34, 35, and 36 show parts of the device for folding the paper over the open ends of the shell;

Figs. 37, 38, and 39 illustrate different steps in the folding of the paper over and down into the open ends of the shell;

Fig. 40 is an enlarged cross-section on line 40—40 of Fig. 37, the parts being viewed in the direction indicated by the arrows;

Fig. 41 is a similar view on section line somewhat to the left of the position of the section line 40—40, and Fig. 42 is a perspective view of one of the plungers.

The machine comprises a table-top 50 (Fig. 1), supported on four legs 51, 52, 53, and 54, (Figs. 2, 3, 4 and 5), connected together by horizontal bars or braces 55, 56, 57 and 58. Power for the driving of the machine is derived from an electric motor 59 (Figs. 1 and 2) bolted to the leg 53 and the connecting-bar 57, such motor being equipped with a pinion 60 (Fig. 1) meshing with a gear 61 revoluble on a stud-shaft 62 supported by a bracket 63 secured to a face of the table-leg 53. Gear 61 has fastened thereto a pinion 64 in mesh with a larger gear 65 on the main drive-shaft 66 revoluble in bearings 67, 67, (Figs. 4 and 5) on the horizontal connecting-bars 56 and 58. Gear 65 is loose on the drive-shaft 66, and may, at will, be coupled to the shaft by clutch-mechanism 68, (Figs. 1, 4, and 5) of any suitable character and operable by an upstanding handle 69 (Figs. 1, 2, and 5) at the front of the machine, fastened to a rock-shaft 70 rotatable in bearings 71, 72, supported by table legs 51 and 54 (Fig. 2). This rock-shaft 70 has an arm 73, (Figs. 1, 2, and 4), fastened thereto, pivotally connected by a bent link 74ᵃ (Fig. 4), which passes over the horizontal bar 58 and under the opposite horizontal bar 56, and is pivotally connected at its rear end to an arm 74 fixed to and depending from a rear rock-shaft 75 revoluble in bearings 76, 77, (Fig. 1), mounted on the legs 52 and 53. By suitable arms 78, (Figs. 1, 4, and 5), rock-shaft 75 is operatively connected to the clutch-mechanism. Obviously, the manipulation of the handle 69 controls the action of the clutch, governing the starting and stopping of the machine. In order that the machine may be turned over by hand, as is sometimes required, the front end of the drive-shaft 66 is equipped with a handle 79, (Figs. 1, 2, 4 and 5).

The machine is adapted to feed scored pasteboard blanks individually to a form, bend them around the form, cover them with paper wider than the blank, and then, after this partially-completed box-element has been removed from the form, tuck the protruding edges of the covering-paper into the open ends of the slide and cause them to adhere to its inner faces to provide a finished appearance to the ends or edges of the slide or shell. The means for feeding the blanks will be first described.

The blanks 80, as illustrated in Fig. 10, are scored transversely on three lines 81, 82, and 83, dividing the blank into four sections 84, 85, 86, and 87, of which the two parts 84 and 85 represent the width of the finished shell or slide, and the parts 86 and 87 its thickness, and its length being indicated by the width of the blank.

The magazine for these blanks, and in which they are stacked with their scored faces upward, is composed of two cast-metal members 88 and 89 (Figs. 1, 2, 3, 6 and 7), each having a slotted foot 90 (Figs. 1, 6, and 7) adapted to rest on and be adjustably fastened to the table-top, and also having a vertical wall 91, the outer face of which is equipped with a threaded lug 92, (Figs. 2 and 6), accommodating a screw 93 which passes through a hole in a rearwardly bent ear 94 of a guide-plate 95 held against the front edge of the wall 91 by means of a pair of screws 96 (Fig. 6) taking into threaded holes of the vertical wall 91 and extending through vertical slots 97 of the guide plate. This construction permits of vertical adjustment of the guide plate, which is assisted by a helical spring 98 surrounding the screw 93 and accommodated between the lug 92 and the ear 94. By loosening the screws 96, and turning the adjusting screw 93, a desired vertical position of the guide-plate may be readily secured and the plate maintained in its adjusted position by tightening the screws 96.

Each of the magazine walls 91 has three horizontal slots 99 (Fig. 7) accommodating a corresponding number of screws 100, which adjustably hold a vertical guide-bar 101 against the inner face of the wall. A supporting-bar 102 is secured horizontally to the inner-face of each of the magazine walls 91 just below the guide members 95 and 101.

On the table-top, between the upright magazine walls 91, a bearing member 103, (Figs. 1 and 6) is bolted, and on this a central supporting-bar 104 is mounted, its top surface being in register with the upper surfaces of the two supporting-bars 102, all three of these supporting the stack of pasteboard blanks in the magazine. (Fig. 3).

The lower ends of the rear guide-bars 101 may engage the upper faces of the blank-supporting bars 102. The lower edges of the front guide-plates 95 are positioned above the top faces of the supporting-bars 102 a distance corresponding substantially to the thickness of one of the pasteboard blanks, which construction, as will be obvious, permits the forward removal of the lowermost blank, its withdrawal occasioning the descent of the remainder of the blanks under the action of gravity, so that the next lowermost one can be pushed out.

A horizontal, narrow plate 105, (Fig. 6) by means of slots 106 therein and screws 107, is fastened to the right-hand guide-plate 95 and projects over the middle supporting-bar 104, at which point it is equipped with a vertical finger 108, the lower face of which is above the bar 104 a distance corresponding approximately to the thickness of one of the pasteboard blanks.

In order to secure the proper positioning of the magazine members 88 and 89, three guide-bars 109, 110 and 111 (Fig. 1); are secured to the table-top, the foot 90 of the member 89 being accommodated between the bars 110 and 111, the foot of the companion magazine member 88 being received between the guide-bar 109 and the support for the covering-paper slide described hereinafter. The foot of each of these members 88 and 89 is fastened to the table-top by a screw 112 which extends through the foot slot 113, such fastening of the members to the table permitting the expansion and contraction of the blank magazine, as will be readily understood.

Each of the members 88 and 89 has a rearwardly-extended bearing 114 (Figs. 6 and 7) accommodating a sliding shaft 115 provided on its under surface with rack teeth 116, which in effect makes the sliding shaft a rack. At its front end, each of these racks carries an angle support or bracket 117, to which is fastened a pusher or blank-discharger 118 equipped with a shoulder 119 adapted to engage the rear edge of the blank. The lower edge of this pusher plate or member is flat and is adapted to ride on a pair of rollers 120, 121, rotatably mounted on stud-shafts 122, 123, located in the recess or cavity 124 in the lower portion of the magazine member, which cavity also accommodates the rack shaft 115, as is clearly illustrated. The blank-engaging upper portion of the pusher travels beside the blank-supporting horizontal bar 102, as shown. It should be clear therefore that each of the magazine members carries its own blank-ejecting mechanism, so that as the members 88 and 89 are adjusted with reference to one another, the pusher mechanisms are also adjusted.

These blank-ejecting pushers are operated by means of a pair of comparatively wide gears 125, 126, (Figs. 3 and 7) mounted on a cross-shaft 127 at the rear of the machine and revoluble in a pair of bearings 128 and 129 (Fig. 3). This shaft is also supplied with a pinion 130 (Fig. 1) the teeth of which are in mesh with those of a vertical rack 131 slidable in a bearing 132 of the member 103 and extending downwardly through an aperture in the table top. The lower end of this rack-bar is bifurcated at 133, (Fig. 4), to straddle the drive-shaft 66, and is equipped with a roller 134 traveling in a groove 135 in the side of a cam 136 mounted on and revoluble with shaft 66.

From an understanding of this construction, it should be clear that the supply of rectangular pasteboards or blanks 80 is held in the magazine between the vertical guides 95, 95, and 101, 101, resting on the three horizontal supporting bars 102, 102, and 104. The rotation of shaft 66 causes the vertical reciprocation of the rack 131, which effects the oscillation of shaft 127 and its pair of gears 125, 126. These, of course, reciprocate the rack-shafts 115, 115, and the pushers 118, 118. When these pushers travel forwardly, their shoulders 119, 119 engage the lowermost blank and eject it from the magazine forwardly under the edges of the members 95, 95, and 108.

A form shaft 137, (Figs. 1, 3, and 15) is revolubly accommodated in a bearing of the bearing-member 103, such shaft being also supported in a rear bearing 138 bolted to the table-top. This shaft has fixed thereto a clutch-member 139 (Fig. 15), and it also has revolubly mounted thereon a companion clutch member 140 fastened to a pinion 141 likewise rotatable on the shaft, the teeth of such pinion meshing with those of a rack 142 (Figs. 1, 3, and 15), vertically slidable through an aperture in the table-top and guided by a bearing portion 143 (Fig. 1) of the rear bearing-member 138. The lower end of the rack-bar 142 is divided at 144 (Fig. 3) so as to extend on opposite sides of the drive-shaft 66, being guided in its vertical movements thereby. This rack-bar has a roller 145 in a groove 146 in the side of cam 147 secured to and revoluble with shaft 66.

The clutch member 139 is provided with a hole 148 (Fig. 15) adapted to receive a lock 149 vertically slidable in a bearing 150 bolted to the table, such lock extending downwardly through an aperture in the table-top. This lock member, below the table-top, has two lugs 152, 153, between which an end of an elbow-lever 154 and a coil-spring 151 are received, such lever being fulcrumed at 155 (Figs. 3 and 5) beneath the table top, the roller 156 on its lower-end riding on the peripheral cam surface of cam 136. A coiled contractile spring 157 (Fig. 3) is fastened to one arm of the elbow-lever, the other end of the spring being secured beneath the table-top, and holds the cam-roller against the cam-surface with which it coacts.

The clutch-mechanism which coöperates with the companion clutch-members 139 and 140 permits the member 140 to rotate the member 139 and the shaft 137 to which it is secured only during the upward travel of the rack 142, the clutch member 139 being held against movement by the lock 149 entering the hole 148 during the reverse movement of the member 140, that is, during the descent of the rack 142. Any suitable and well known form of clutch device for this purpose may be provided, and a detailed description and illustration of the particular form employed is not deemed necessary.

A rectangular form 158 (Figs. 8, 9, 11, 12, 13, 14, 15, and 17) is detachably fastened, as by means of a pin 159 (Fig. 15) to the front end of the form shaft 137, the form being readily replaced by another of different size and shape, when desired. The edges of the form are longitudinally slotted at 160 and 161 (Fig. 8), to accommodate the mechanism which strips off the covered shell, as described hereinafter.

The means for folding the scored pasteboard blank around the form comprises the following coöperating instrumentalities, it being understood that the blank is delivered from the magazine to the form above and is bent downwardly around its edges and then across the bottom.

A bar 162, (Figs. 1, 4, 5, and 18), is vertically slidable in a bearing 163, its lower end being bifurcated at 164 (Figs. 4 and 5), to accommodate the shaft 66, the lower portion of this bar having a roller 165 located in a cam groove in the side of cam 166, fixed on shaft 66. This cam, of course, causes the vertical reciprocation of the bar through an aperture in the table-top. A block 167, (Figs. 1, 4, 5, and 18) of irregular shape is pivoted or fulcrumed on the upper portion of bar 162 by means of a pin 168 (Figs. 5 and 18) secured to the block and revoluble in a bearing in the bar. In order to limit the backward swing of this block on its pivotal support, the pin is provided with a collar 169 (Fig. 9) having a pin 170 adapted to engage a stop 171 projecting laterally from the side of the bar. To hold the block securely in operative position, it is equipped with angle portions 172, 173, (Fig. 1), adapted to co-act with two of the faces of the bar, the one part 172 acting as a stop to limit the downward swing of the block, the other part 173 assisting in the guiding of the block and in its support. A clamping handle 174 is pivoted on the block at 175 (Fig. 9) and has a cam end 176 adapted to bear against a face of the bar 162, as illustrated in Fig. 1, to hold the block securely in normal operative position.

The top face of this block is recessed at 177 (Fig. 18), for the accommodation of two bars 178 and 179 (Figs. 1 and 18) and the tongue 180 of the clamping plate 181 secured to the block by screws 182, 182, such tongue being accommodated between the bars. At one side of the block, the bar 178 has a depending plate portion 183 (Fig. 8) with a blank-supporting shoulder 184 having its lower edge in substantial alinement with the top surface of the corresponding blank-supporting bar 102 of the magazine. At the other side of the block 167, the bar 179 has a downturned plate 185 (Fig. 8) with a blank-supporting shoulder 186 approximately in alinement with the top of the corresponding bar 102 of the magazine. This plate 185 is horizontally slotted at 187 (Fig. 19) for the reception of the screw 188, which fastens to its inner surface a stop or gage 189, against which the front edge of the blank is adapted to engage. Bar 162 and the parts described mounted thereon constitute a blank carrier or conveyer; but the block also has means upon it for folding the blank downwardly across the edges of the form, which will now be described.

Two folders 190 and 191 (Figs. 8 and 20) are pivotally mounted on block 167 at 192 and 193, each of the folders having a bifurcated upper portion straddling the block. The block has a depending web or rib 194 (Fig. 8) and each of the folders is associated with such web by means of an adjusting screw 195 threaded into the web, equipped with a coiled contractile spring 196 between the folder and the head of the screw, a collar 197 pinned to the screw, and a set nut 198 to prevent unintentional turning of the screw. The springs 196, 196, permit the hinged folders to swing outwardly against their action, and the collars 197, 197 act as gages or stops limiting the inward swinging of the folders under the action of such springs.

The presser-plate 199 (Figs. 8 and 18) has two rods 200 slidable in holes in the rib 194, the rods being surrounded by expansion springs 201 yieldingly pressing the plate downwardly toward the form, the extent of movement of the presser-bar away from the rib being limited by any suitable stop device.

To fold the end portion of the blank across the bottom of the form, the following parts are employed:

The peripheral face of cam 166 has a roller 202, (Fig. 5) traveling thereon, such roller being mounted on one arm of an elbow-lever 203, (Figs. 5 and 8), fulcrumed at 204 on the supplemental table described hereinafter and located beneath the main table-top. The other arm of the bell-crank lever 203 has a bearing 205 in which are fulcrumed the two bent arms 206, 207, (Fig. 22), which at their upper ends are connected together by the folder bar 208. The ends of the arms 206 and 207 extending beyond the bearing are connected to the depending arm of the elbow lever by a pair of contractile springs 209, 209, (Fig. 8).

A supplemental table 210 (Figs. 21 and 22) is mounted above the main table top on two vertical rods 211, 212, extending downwardly through apertures in the table top and having their lower ends accommodated in split clamp bearings 213 and 214, (Fig. 3) on the horizontal supports 55 and 57, respectively. The vertical adjustment of this supplemental table is determined by two screws 215 and 216, (Fig. 21) each having threaded engagement with the supplemental table and bearing at its lower end against the table top 50. Obviously, by freeing the clamps 213 and 214 and turning the screws 215, and 216, the height of the supplemental table above the main table may be adjusted, after which the clamps should be tightened.

This upper or supplemental table carries a rearwardly-extending bearing 217 (Figs. 21 and 22) accommodating a rock-shaft 218, to which a shorter arm 219 and a longer arm 220 (Figs. 21, 22 and 25) are clamped or fixed, the shorter arm having a pivotal connection at 221 with a cam bar 222 (Figs. 5, 21, and 22) straddling the shaft 66 and having a roller 223 traveling in the inner cam groove 224 in the side face of cam 225.

The arm 220 has adjustably mounted on its top surface, by a screw 226, (Figs. 21 and 22) and slot 227, a supporting-block 228, (projecting between the arms 206 and 207) having a pair of holes slidingly accommodating a pair of round rods 229, (Figs. 21, 23 and 24) connected together at their top ends by a presser-bar 230, upward movement of the rods being limited by cotter-pins 231, expansion springs 232 surrounding the rods between the presser-bar and the block. In this way the presser-bar is yieldingly mounted above the block. Another vertical presser-bar 233, (Figs. 21, 22 and 24) is yieldingly mounted on the end of the block 229 by means of screws 234 passing through the lower portion of the presser-bar and having threaded engagement with the block, springs 235 being interposed between the heads of the screws and the presser-bar. On the opposite sides of arm 220, rollers 236 (Fig. 25) are mounted for coöperation with the bent arms 206 and 207 (Fig. 8).

Another table or slide-supporting block 237, (Figs. 1 and 8) is fastened to the table-top 50, its base acting as a guide for the foot of the magazine member 88, the companion guide being the part 109. A plate 238, by slots 239 and screws 240, is adjustably fastened to the member 237, its front edge constituting a stationary, shear-blade. A curved paper-support 241 is fastened to the table 237 and projects beyond plate 238 and a movable knife or shear blade 242, which coöperates with the stationary knife-blade or plate 238, is adjustably mounted by screws and slots 243 and 244 (Fig. 1) on an arm 245 (Fig. 4) fulcrumed in a bearing 246 (Figs. 4 and 8) on the top of table 237. A link 247 (Fig. 4) connects the knife arm 245 to an arm 248 fastened to a supplemental rock-shaft 249 revoluble in bearings 250 and 251 mounted on the under side of table-top 50. An arm 252 is pinned to this shaft and carries a roller 253 co-acting with the groove 254 in the side of cam 255 angularly adjustable on the shaft 66 by a screw 256 passing through a curved slot 257 in the flange 258 of collar 259 fixed to the shaft 66.

On its top face, table 237 has a dovetail groove 260 (Fig. 4) receiving a correspondingly-shaped paper slide or feeder 261 (Figs. 4 and 8) having a rib 262 (Fig. 1), acting as a paper guide and a companion guide rib 263 adjustably mounted on the slide so as to be capable of adjustment toward and from the rib 262. This is desirably accomplished by means of screws 264 passing through slots 265 in such companion rib. This slide is also equipped with a third rib 266, and with an extension 267, (Fig. 8) sliding over the shear plate 238 and the curved paper-support 241. By means of springs 268, (Fig. 1) secured to the tops of ribs 262 and 266, a bearing member 269 bridging the slide plate 261 is detachably fastened. This support 269 carries a spring wire presser 270, (Figs. 1 and 8), the active end of which is located above the extension plate 267. Member 269 also carries a plurality of spring-pressed dogs 271, of well known construction, which engage the top of the paper strip on the slide and permit it to advance relatively to the slide, but prevent retraction of the paper under them. That is to say, these dogs grip the paper and carry it forwardly, and also permit the paper to be drawn forwardly under them. This slide is reciprocated by means of a bell-crank or elbow-lever 272, (Figs. 2, 3, and 4) fulcrumed in a bearing 273 mounted on the horizontal table-leg connecting part 55. One end of this bell-crank lever has a roller 274 (Fig. 5) traveling in the outer cam groove 275 of cam 225.

This machine is equipped with means for applying glue to a strip or roll of covering or finishing paper, which gluing mechanism is operated by means of a belt, (not shown), coacting with a pulley 277 (Figs. 4 and 5), on shaft 66, but inasmuch as paper-gluing appliances for this purpose are well known, it is not deemed necessary to illustrate them.

The mechanism is also supplied with an air-blast pump 278, (Figs. 1, 2, 3, 4, and 5), the piston rod 279 (Fig. 3) of which extends down through the table-top, and is equipped at its lower end with a projection 280 coöperating with the peripheral cam surface of cam 147, this cam acting at the proper time to lift the piston, eject a blast of air, and then permit the piston to descend. The pump is provided with a hose 281 (Fig. 1) and a discharge nozzle 282 supported by a bracket 283 in proper position to prevent the covering paper from being blown upwardly due to the actuation of parts of the mechanism, (Fig. 11).

The means for folding the blank around the form and for covering it with the finishing paper operates practically as follows:

When the shoulders 119 of the blank-ejecting pushers 118 discharge the lowermost blank in the magazine forwardly, the block 167 and the vertical plates 183 and 185 carried thereby are stationary in their uppermost position of travel, with the shoulders 184 and 186 in substantial register with the bottom of the magazine so as to receive and support the discharged blank, which is advanced and engages the stop or gage 189. As thus supported in this carrier, the blank is below the presser plate 199 and the two folders 190 and 191 (see Fig. 8). While the form is held fixedly in horizontal position against rotation by the lock 149, this carrier, with the blank, descends, deposits the blank on the top face of the form, against which it is held by the spring-actuated presser 199, and as the carrier continues its downward stroke, the spring-pressed folders 190 and 191 bend the sections 87 and 86 of the blank downwardly over the edges of the form (see Fig. 9), the section 84 of the blank forming a downward extension of the section 86. This action brings the scores 82 and 83 in register with the upper corners of the form, and the score 81 in register with the lower left-hand corner of the form, as the latter is viewed from the front of the machine. In this folding operation, the lower ends of the folding fingers 190 and 191 travel about half way down the thickness of the form, and temporarily remain in this position, holding the bent portions of the cardboard blank against the form. At about this time the arm 220 begins its upward travel, permitting the folder-bar 208, under the action of its springs 209, 209, and by reason of the co-operation of the bent arms 206, 207, with the rollers 236, to traverse about a half of the bottom of the form, folding the section 84 of the blank up against such under face of the form. (See Fig. 11).

The forward travel of the paper slide had begun just previous to the beginning of the descent of the carrier and, soon after the folder 208 has completed its stroke half way across the bottom of the form, the forward end of the paper, adhesively-coated on its upper face, is projected beneath the adjacent portion of the blank section 85. Then, the continued upward swing of the arm 220 causes the presser-bar 230 to bring the forward portion of the paper into contact with that part of the blank on the bottom of the form, and the presser-bar 233 passes upwardly, carrying the tacky paper around the corner of the box and against the section 87 of the blank. (See Fig. 11).

At about this time the carrier block 167 and the parts mounted thereon begin their upward or reverse stroke, and the paper slide begins a partial back stroke, but the paper slide soon advances again, forming a loop in the covering paper, (see Fig. 12), so that during the beginning of the rotation of the form the advance portion of the covering paper adhering to the pasteboard will not be unglued therefrom. After forming this loop in the paper, the paper slide retracts again to the full end of its stroke, temporarily ceasing such retraction, during which period the shears or knife-blades sever from the main body of paper the portion partly adhered to the box-shell. (See Fig. 13).

Practically as soon as the pressers 230 and 233 have applied the covering paper around the lower right-hand corner of the shell, as it is viewed from the front of the machine, the lock 149 becomes inoperative and the form begins its rotation in a clockwise direction, (see Fig. 12), the presser 230, owing to its spring mounting, following the form somewhat in the initial turning of the latter, but the arm 220 swings down and carries the two pressers 230 and 233 away from the form, which completes one revolution, and is then again locked stationary.

During this rotation of the form, the revolving shell thereon draws its covering paper from beneath the spring wire presser 270 and the spring-pressed dogs 271 during the backward movement of the paper slide. That is to say, the paper is sufficiently adhered to the pasteboard to draw its own supply of paper forwardly. During this turning of the form, folder bar 208, under the action of its springs, follows the contour of the form, (see Fig. 13), assisting in pressing the paper into place and causing its proper adhesion. After the form has made its revolution and become again locked, this wiping bar 208, by reason of the shape of the peripheral edge of cam 266, is caused to wipe entirely across the lower face of the box-shell, (see Fig. 14), causing the end of the paper to overlap the first end applied and adhere thereto. During a portion of this wiping action by the member 208, the arm 220 and the parts carried thereby rise again somewhat, but do not operatively co-act with the parts on the form.

The air-blast mechanism is provided so as to prevent the advancing end of the covering paper from being blown up, due to the action and movement of the folding and wiping bar 208, the blast counteracting any such fanning action which the movement of this member occasions.

The folded blank now on the form is in the shape of a double open-ended shell or slide covered with finishing paper, the edge portions of which protrude beyond both ends of the slide. The folding of these parts into the slide and causing them to adhere to its inner surfaces is effected by another portion of the mechanism about to be described.

At the front of the machine, a casting 284, (Figs. 1, 2, 4, and 30) is bolted to the table top, and at its top has a bearing 285 reciprocatingly receiving a slide-bar or transporter 286. At the rear end of the slide, at 287, (Figs. 26-30) a bell-crank 288 is pivoted; also on the slide, at 289, another bell-crank 290 is pivoted, the adjacent arms of such bell-cranks overlying one another, and one provided with a pin 291 housed in a slot 292 of the other. This connection, of course, causes simultaneous swinging of the two bell-cranks on their pivots. Bell-crank 288 has an extension 293 secured thereto, to which is connected one end of a coiled contractile spring 294, the other end of the spring being fastened to a stud 295 on the slide. This spring tends to rock the rear ends of the pair of bell-cranks toward one another. Each bell-crank at its rear end is provided with a depending hook 296 adjustably mounted thereon by a screw 297 and slot 298. In order to limit the approach of these hooks toward one another, the slide bar 286 has an upstanding pin 299, (Fig. 26) adapted to be engaged by the overlapping parts of the companion bell-cranks. Bell-crank 290 has a forwardly-projecting extension 300 supplied with a roller 301 coacting with a bar 302 fastened to the top end of a lever 303 (Fig. 2); fulcrumed beneath the table-top at 304, the lower end of such lever having a roller 305 traveling in a cam groove cut in the side face of cam 306 fixed on shaft 66.

The lower face of the slide bar 286 has a rack 307 (Fig. 30) teeth of which are in mesh with those of a gear 308 fixed on the short shaft 309 accommodated in bearing 310 (Fig. 4) of casting 284, and also revoluble in a bearing 311 (Fig. 2) of another casting 312 bolted to the table-top and forming a bearing 313 for the vertically sliding rack 314 extending down through a hole in the table-top and having its teeth above the table-top in mesh with those of a pinion 315 fixed on shaft 309. The lower end of rack-bar 314 is bifurcated at 316 (Fig. 4) to accommodate and be guided by shaft 66, the lower portion of the rack-bar also having a roller 317 received in the cam-slot 318 in the side of cam 319, fastened to drive shaft 66. By means of this cam 319, rack 314, pinion 315, shaft 309, gear 308, and slide-bar rack 317, the slide-bar is reciprocated in proper-timed relation to the movements of the other parts of the mechanism, and the opening and closing of the hooks 296 is governed by the movements of cam bar 302, which are controlled by the action of cam 306.

The actuation of this part of the mechanism occurs substantially as follows:

During the latter portion (approximately one-half) of the stroke of the slide toward the front of the machine,—that is, away from the form—and during approximately the first half of the rear stroke of the slide,—that is, toward the form—a blank is being carried to and folded around the form. Then the slide and the hooks remain stationary during approximately one-half of the rotation of the form. Then the cam-bar 302 moves toward the slide-bar 286, separating the hooks 296 against the action of spring 294. During the latter half of the rotation of the form, the slide, with the hooks thus separated, moves back. (Fig. 27) and after the form with its paper-covered shell has been again locked in horizontal position at the completion of its rotation, the cam-bar 302 backs away, permitting the hooks 296 to engage the rear edges of the shell. Then the slide moves forwardly away from the form, these hooks stripping off the paper-coated shell from the form, and having no interference with the latter because of the form recesses or slots 160 and 161. The slide and its hooks deliver the shell well onto the supplemental or upper table 210 for coöperation with the other parts of the mechanism to be described.

On top of the right-hand portion of this upper-table 210, two bearing elements 320 and 321, (Fig. 1) are fastened, apertured in alinement, and slidingly receiving two round rods 322 and 323 connected together at one end by a cross-bar 324, (Figs. 31 and 38). Each of these rods has a pin 325 extended therethrough, adapted by engagement with the element 321 to limit the advance of the bar 324, and between each of these pins and the element 320 a coiled expansion spring 326 is employed, surrounding the rods.

This upper-table is longitudinally slotted at 327 (Figs. 22, 37-41), for the reception of a conveyer 328 to which is adjustably fastened, by any approved means, a box or shell pusher 331 disposed just above this table-top. The conveyer 328 slides on a rod or shaft 332, (Figs. 2, 4, 40 and 41), supported in bearings 333 and 334 bolted to the main table-top beneath the supplemental table-top. This conveyer is connected by a link 335 (Fig. 4) to the upper end of a lever 336 pivoted in a suitable bearing 337 bolted to the inner face of the horizontal member 57. Such lever carries a roller 338 coöperating with a groove in the side of cam 339.

The cross-bar 324 is, of course, advanced under the action of springs 326, 326, except when it is pushed back by the engagement of the box-pusher 331 therewith, (Fig. 37). Cross-bar 324 has adjustably clamped thereto two right-angled folders 340 (Fig. 31), the positions of which with relation to one another and the cross-bar may be regulated as desired.

The top of this upper-table also has secured thereto a stationary folder 341, (Figs. 33, 34, 37 and 40), with a beveled face 342, such folder being raised slightly above the surface of the table to permit the passage of the protruding marginal portion of the paper beneath it. To the left of this stationary folder, as the parts are viewed from the front of the machine, the table is supplied with another folder 343, (Figs. 35 and 37), with a cam face, which turns or twists from a substantially horizontal position to a vertical position. At the front side of this upper-table, a bar 344, (Figs. 36 and 37) is adjustably secured by means of screws 345, which may take in any of the series of holes 346, and which extend through slots 347 in the bar. Opposite the stationary folder 341, this bar is provided with a like folder 348, raised slightly above the table top for the purpose indicated. Bar 344 is also equipped with a cam folder 349, opposite folder 343, and having a cam face the reverse of that of the folder 343, but adapted to accomplish the same function of turning the paper from a horizontal into a vertical position.

The table 210 has four studs 350 (Figs. 21, 37 and 40), (preferably shouldered, screw-threaded studs permitting vertical adjustment of their length) rising therefrom and adapted to detachably support an upper plate 351 having on its under surface, and spaced away downwardly from its under face, a folder 352 (Fig. 40), located directly above the folder 341. It also has a cam folder 353 (Figs. 21 and 40) above the corresponding folder 343. In addition to this, it has a bar or plate 354, (Fig. 41) adjustably fastened by screws 355, and a series of holes and slots, to its under surface, and carrying a folder 358 spaced downwardly away from the under face of the plate and located above the folder 348, this construction being similar to that of bar 344 and its associated parts. This bar also has fastened thereto a cam folder 359 above the companion folder 349.

Plate 351 has an extension 360 (Fig. 22) under which the box slides or shells travel, and it is furthermore equipped on its top face with two bars 361 and 362 bridged by a third bar 363.

This plate 351 and the parts mounted thereon are yieldingly held down in position on the studs 350 by a spring-pressed rod 364 (Fig. 5) extending through a hole in the end of a bell-crank handle 365, the rod having cross-pins 366 and 367 (Fig. 4) preventing its detachment. Handle 365 is rockingly mounted on casting 312, on which is also fixed a curved plate 368 (Fig. 5) provided with a notch 369. A dog 370 is pivoted on the handle at 371, and is adapted to engage the notch to hold the handle in such position that the rod 364 will exert spring pressure downwardly on the upper plate through the bridge-bar 363. To release the dog, the handle 365 has a lever 372 fulcrumed thereon at 373 in coöperative relation to the tail of the dog.

The parts just described operate to turn the marginal portions of the covering paper over all four edges at each end of the shell or slide, but it is necessary to bend these parts still further into the shell and cause them to adhere to its inner faces.

This mechanism comprises two bearing members 374, 375, (Fig. 1), bolted to the main table top and slidingly accommodating two hollow shafts 376, 377, each supplied with a key 378 to prevent its rotation in the bearings, and each also equipped with rack-teeth 379. The rack-teeth of shaft 376 are in mesh with those of a pinion 380 on an upright shaft 381 (Fig. 37,) adapted to oscillate in a bearing 382 of the member 374 and also in a bearing 383 (Fig. 5), depending beneath the table top. Below the table, shaft 381 has a short arm 384 fast thereto and connected by a link 385 to a similar arm 386 secured to the vertical shaft 387 revoluble in bearings 388, 389, and having above the latter a pinion 390 fastened thereto and in coöperative relation with the teeth of shaft 377.

In order to rock these two vertical shafts 381 and 387 in unison, the lower end of the latter is provided with a gear 391 in mesh with the teeth of a toothed sector 392 (Fig. 5), on the upper end of an elbow lever 393 rockingly mounted in a bearing at 394, and having its other end supplied with a roller 395 co-acting with a cam groove 396 in the side face of cam 306. By these instrumentalities, the companion alined shafts 376 and 377 are caused to approach one another and recede from one another in unison.

Shaft 376 has a plunger 397 (Figs. 37, 40, 41, and 42) detachably fastened to its front end by a screw 398 (Fig. 1) extended through the hollow interior of the shaft and having a handle 399 at its rear end. In like manner, the rear end of shaft 377 has a plunger 400 detachably secured thereto by a screw 401 having a turning handle 402. (Fig. 1.) These plungers are mounted on their respective shafts in any approved manner so as to prevent rotation or dislodgment, and their vertical faces are somewhat convexed at 403, (Fig. 42) for a purpose hereinafter described.

While the hooks 296 are stripping the papered shell from the form or core, the conveyer 328 and attached box-pusher 331 are traveling toward the cross-bar 324, and the member 331 engages the latter and pushes it out of the way of the oncoming shell which is advancing under the action of the hooks 296, the latter delivering the box between the folders 340 and the folders 341, 348, 352 and 358, and then moving toward the blank magazine to get out of the way. The conveyer 328 and pusher 331 then travel to the left, the cross-bar 324 and its folders 340 following after them under the action of springs 326, and during such movement the folders 340 bend the projecting paper over the adjacent, opposite, vertical edges at the two ends of the slide or shell, (Fig. 39).

As the shell continues its travel under the action of pusher 331, the projecting portions of the paper are folded over the other two vertical edges at the opposite ends of the shell by the four folders 341, 348, 352 and 358, (Fig. 39). That is to say, this folding is accomplished as the box element travels between these four folders. Then, as the box continues its movement between the four cam folders 343, 349, 353, and 359, the paper is folded simultaneously over the four horizontal edges of the box; namely, over the upper and lower horizontal edges at each end of the shell.

It is still necessary to force these folded parts of the paper into the opposite ends of the shell and cause them to adhere to its inner faces. The pusher 331 delivers the shell in register with the two plungers 397 and 400, the pusher temporarily remaining in this position. Then the two plungers advance toward one another (Fig. 37) and push the paper into the ends of the shell, causing it to adhere to all four inner surfaces at each end of the shell. An adequate adhesion is secured by reason of the pressure exerted on the upper plate 351 and the squeezing action between the plungers and the then stationary pusher 331. By making the vertical walls of these plungers convex in shape, a better adhesion of the paper to the corresponding inner faces of the shell is obtained. The plungers then recede and leave the shell to be discharged from the machine by the next oncoming box.

The capacity of the machine is high by reason of the fact that the mechanism is operating on several box shells or blanks at the same time. Stated somewhat differently, while the form is revolving and receiving its covering paper, the next blank is being ejected from the magazine into the carrier, and at the same time the preceding shell is being forced between the various folders by the pusher 331, such shell being also operated upon during the rotation of the form by the companion plungers 397 and 400. While the pusher 331 is receding, a shell is being stripped from the form, and as soon as it leaves the form the carrier decends and applies a new blank to the form.

It should be noted that all of the necessary parts of this mechanism are made adjustable, or detachable and replaceable, so that shells of different sizes and shapes may be made in a single machine.

Obviously, the numerous parts of this mechanism could be modified in structure within comparatively wide limits without departure from the essence of the invention, and such minor mechanical changes are intended to be covered by the claims hereto appended. It should be noted, that, if desired, the covering paper need not extend beyond the ends of the shell or slide and, of course, under such circumstances, the folding appliances for turning it in the open ends need not be employed.

I claim:

1. In a machine of the character described, the combination of a form, means to intermittently revolve the form, a blank magazine, means to discharge the blanks individually from the magazine, a carrier adapted to receive the blank from the magazine and convey it into proximity to the form, means to actuate said carrier, means to fold the blank around the form while the latter is stationary, and means to cover the bent blank on the form with a finishing-material during rotation of the form, substantially as described.

2. In a machine of the character described, the combination of a form, means to intermittently revolve the form, a blank magazine, means to discharge the blanks individually from the magazine, a carrier adapted to receive the blank from the magazine and convey it into proximity to the form, means to actuate said carrier, means to fold the blank around the form while the latter is stationary, means to cover the bent blank on the form with the finishing material during rotation of the form, and means to strip the covered bent blank from the form, substantially as described.

3. In a machine of the character described, the combination of a form, means to intermittently revolve the form, a blank magazine, means to discharge the blanks individually from the magazine, a carrier adapted to receive the blank from the magazine and convey it into proximity to the form, means to actuate the carrier, means to bend the blank around the form while the latter is stationary to provide a shell with opposite open ends, means to cover the bent blank on the form during the rotation of the latter with a finishing-material wider than the blank so that the material projects beyond both open ends of the shell, and means to fold the projecting parts of such material into the open ends and against the inner surfaces of the walls, substantially as described.

4. In a machine of the character described, the combination of a form, means to intermittently revolve the form, a blank magazine, means to discharge the blanks individually from the magazine, a carrier adapted to receive the blank from the magazine and convey it into proximity to the form, means to actuate the carrier, means to fold the blank around the form while the latter is stationary to provide a shell with opposite open ends, means to cover the bent blank on the form during the rotation of the latter with a finishing-material wider than the blank so that the material projects beyond both open ends, means to strip such covered shell from the form, and means to fold the projecting portions of the covering-material into the open ends of the shell and against the inner surfaces of its walls after the covered shell has been stripped from the form, substantially as described.

5. In a machine of the character described, the combination of a form, means to intermittently revolve the form, means to bend a blank around the form to provide a shell with opposite open ends, means to cover the bent blank on the form with a finishing material wider than the blank during the rotation of the form, such finishing material projecting beyond both open ends of the shell, means to strip the covered shell from the form, and means to fold the projecting portions of the covering material into the open ends of the shell and against the inner surfaces of its walls, substantially as described.

6. In a machine of the character described, the combination of a form, means to intermittently revolve the form, means to bend a blank about the form to provide a shell with opposite open ends, means to cover the bent blank on the form during the rotation of the latter with a finishing material wider than the blank so that such finishing-material projects beyond both open ends of the shell, means to strip the covered shell from the form, and means to fold the projecting portions of the covering material into the open ends of the shell and against the inner surfaces of its walls, including a plurality of stationary folders, means to transport the box shell, a pair of sliding plungers adapted to enter the open ends of such shell, and means to operate such plungers, substantially as described.

7. In a machine of the character described, the combination of a form revoluble about its own axis, means to intermittently rotate said form on its own axis, a blank magazine, means to discharge the blanks individually from the magazine, a carrier adapted to receive the blank directly from the magazine and convey it into proximity to the form, means to actuate said carrier, means mounted on the carrier and adapted to bend the blank about the form while the latter is stationary, and means to cover the bent blank with finishing material during rotation of the form, substantially as described.

8. In a machine of the character described, the combination of a form, means to intermittently revolve the form, a blank magazine, means to discharge the blanks individually from the magazine, a carrier adapted to receive the blank from the magazine and convey it into proximity to the form, means to actuate said carrier, means mounted on said carrier and adapted to bend the blank about the form, and means to cover the bent blank with a finishing-material, substantially as described.

9. In a machine of the character described, the combination of a form revoluble about its own axis, means to intermittently rotate said form on its own axis, a blank magazine, means to discharge the blanks individually from the magazine, a carrier adapted to receive the blank directly from the magazine and convey it into proximity with the form, means to actuate the carrier, a presser mounted on the carrier and adapted to hold the blank against the form, means mounted on said carrier and adapted to bend the blank about the form while the latter is temporarily stationary, and means to cover the bent blank with finishing material during rotation of the form, substantially as described.

10. In a machine of the character described, the combination of a form revoluble about its own axis, means to intermittently rotate said form on its own axis, a blank magazine, means to discharge the blanks individually from the magazine, a carrier adapted to receive the blank directly from the magazine and convey it into proximity to the form, means to actuate said carrier, spring-pressed pivoted folders mounted on the carrier and adapted to bend the blanks about the form while the latter is temporarily stationary, and means to cover the bent blank with finishing material during rotation of the form, substantially as described.

11. In a machine of the character described, the combination of a form, a blank magazine, means to discharge the blanks individually from the magazine, a carrier adapted to receive the blank from the magazine and convey it into proximity to the form, means to actuate the carrier, and a spring-actuated presser mounted on the carrier and adapted to hold the blank against the form, and spring-pressed pivoted folders on the carrier adapted to bend the blank about the form, substantially as described.

12. In a machine of the character described, the combination of a form, a blank magazine, means to discharge the blanks individually from the magazine, a carrier adapted to receive the blank from the magazine and convey it into proximity to the form, means to actuate the carrier, a presser mounted on the carrier and adapted to hold the blank against the form, folders mounted on the carrier and adapted to bend the blank about the form, a bender adapted to complete the bending of the blank around the form, means to cover the bent blank with a finishing-material, and means to strip the covered blank from the form, substantially as described.

13. In a machine of the character described, the combination of a longitudinally-grooved form, means to intermittently revolve the form, means to bend a blank around the form while it is stationary, means to cover the bent blank with a finishing-material during rotation of the form, reciprocating strippers adapted to remove the covered blank from the form, and means to reciprocate said strippers, substantially as described.

14. In a machine of the character described, the combination of a form, means to intermittently revolve the form, means to bend a blank around the form while the latter is stationary, means to cover the bent blank with a finishing-material during rotation of the form, a slide, a pair of strippers pivoted to the slide, and means controlling the approach of the strippers toward one another and the recession from one another, said strippers being adapted to remove the covered shell from the form, substantially as described.

15. In a machine of the character described, the combination of a form, means to intermittently revolve the form, a blank magazine, means to discharge the blanks individually from the magazine, a carrier adapted to receive the blank from the magazine and convey it into proximity to the form, means to actuate the carrier, means to bend the blank around the form while the latter is stationary, means to cover the blank with a finishing-material during rotation of the form, a slide, a pair of strippers pivoted on the slide, and means controlling the approach of the strippers toward one another and their recession from one another, said strippers being adapted to remove the covered shell from the form, substantially as described.

16. In a machine of the character described, the combination of a form, means to intermittently revolve the form, a reciprocatory carrier adapted to apply a blank to the top of the form while the latter is stationary, means to reciprocate said carrier, folders mounted on the carrier and adapted to bend the blank downwardly over the sides of the form, a bender adapted to fold a portion of a blank across the bottom of the form, means to actuate said bender, and means to cover the bent blank with a finishing material during rotation of the form, substantially as described.

17. In a machine of the character described, the combination of a form, means to intermittently revolve the form, a blank magazine, means to discharge the blanks individually from the magazine, a reciprocatory carrier adapted to receive the blank from the magazine and apply it to the top of the form while the latter is stationary, means to reciprocate the carrier, folders mounted on the carrier and adapted to bend the blank downwardly over the sides of the form, a bender adapted to fold a portion of the blank across the bottom of the form, means to actuate said bender, and means to cover the bent blank with a finishing-material during the rotation of the form, substantially as described.

18. In a machine of the character described, the combination of a form, means to intermittently revolve the form, a reciprocatory carrier adapted to apply a blank to the top of the form while the latter is stationary, means to reciprocate said carrier, spring-pressed pivoted folders mounted on the carrier and adapted to bend the blank downwardly over the sides of the form while the latter is stationary, a pivoted bender adapted to fold a portion of the blank across the bottom of the form, means to actuate said bender, means to cover the bent blank with a finishing-material during rotation of the form, and means to strip the covered blank from the form, substantially as described.

19. In a machine of the character described, the combination of a form, means to intermittently revolve said form, a reciprocatory carrier adapted to apply a blank to the top of the form while the latter is stationary, a presser mounted on said carrier and adapted to hold the blank against the form, means to reciprocate said carrier, folders mounted on said carrier and adapted to bend the blank downwardly over the sides of the form, a bender adapted to fold a portion of the blank across the bottom of the form, means to actuate said bender, means to cover the bent blank with a finishing-material during rotation of the form, and means to strip the covered shell from the form, substantially as described.

20. In a machine of the character described, the combination of a form, means to intermittently revolve said form, a blank magazine, means to discharge the blanks individually from the magazine, a reciprocatory carrier adapted to receive the blank from the magazine and convey it into proximity to the form, means to reciprocate said carrier, a presser mounted on the carrier and adapted to hold the blank against the form, folders mounted on the carrier and adapted to bend the blank over the sides of the form, a bender adapted to fold a portion of the blank across the bottom of the form, means to actuate said bender, means to cover the bent blank with a finishing-material during rotation of the form, and means to strip the covered shell from the form, substantially as described.

21. In a machine of the character described, the combination of a form, means to intermittently revolve the form, a reciprocatory carrier adapted to apply a blank to the form while the latter is stationary, means to reciprocate the carrier, folders mounted on the carrier and adapted to bend the blank over the sides of the form, a spring-pressed pivoted bender adapted to fold a portion of the blank about the form, means to cover the bent blank with a finishing-material during rotation of the form, the bender being free to follow the contour of the blank during such rotation, and means to strip the covered shell from the form, substantially as described.

22. In a machine of the character described, the combination of a form, means to intermittently revolve the form, a blank magazine, means to deliver the blanks individually from the magazine, a carrier adapted to receive the blanks from the magazine and convey them into proximity to the form while the latter is stationary, means to bend the blank around the form, means to feed a supply of adhesive-coated covering-material, a presser adapted to apply the advance end of such covering-material to the bent blank, the blank being covered by such material during its revolution, and means to remove the covered blank from the form, substantially as described.

23. In a machine of the character described, the combination of a form, means to intermittently revolve said form, a blank magazine, means to deliver the blanks individually from the magazine, a carrier adapted to receive the blanks from the magazine and convey them into proximity to the form while the latter is stationary, means to bend the blank around the form, means to feed a supply of adhesive-coated covering-material, a presser adapted to apply the advance end of such covering-material to the bent blank, the blank being covered by such material during its revolution, means to remove the covered blank from the form, and means to fold the protruding portions of the covering-material into the open ends of the shell, substantially as described.

24. In a machine of the character described, the combination of a form, means to intermittently revolve said form, a blank magazine, means to deliver the blanks individually from the magazine, a carrier adapted to receive the blanks from the magazine and convey them into proximity to the form while the latter is stationary, means to bend the blank around the form, means to feed a supply of adhesive-coated covering-material, a presser adapted to apply the advance end of such covering-material to the bent blank, the blank being covered by such material during its revolution, said feeding-means providing slack in the supply of covering-material as the form begins to revolve to prevent detachment of its adhered end, and means to remove the covered shell from the form, substantially as described.

25. In a machine of the character described, the combination of a form, means to bend a blank around the form, means to feed an adhesive-coated covering-strip, means to affix the advance end of such strip to the bent blank, and means to revolve the form on its axis, during which revolution the remainder of the covering-operation is effected, said covering-strip feeding-means providing slack in the supply of covering material as the form begins to revolve to prevent detachment of its adhered end, substantially as described.

26. In a machine of the character described, the combination of a form, means to intermittently revolve said form, means to feed a bent blank around the form while the latter is stationary, means to feed an adhesive-coated covering-strip, means to affix the advance end of such strip around a corner of said bent blank while the latter is stationary, the remainder of the covering-operation occurring during the rotation of the form, and means to remove the blank from the form, substantially as described.

27. In a machine of the character described, the combination of a form, means to bend a blank around the form, means to feed an adhesive-coated covering-strip, a duplex spring-actuated presser adapted to affix the advance end of such strip around the corner of said bent blank, and means to revolve the form during the remainder of the covering operation, substantially as described.

28. In a machine of the character described, the combination of a form, means to bend a blank around the form, means to feed an adhesive-coated covering-strip, means to affix the advance end of such covering-strip around a corner of said bent blank, and means to revolve the form about its own axis during the remainder of the covering-operation, such feeding-means providing slack in the supply of covering-material to prevent detachment of its adhered end, substantially as described.

29. In a machine of the character described, the combination of a form, means to bend a blank around the form, means to feed an adhesive-coated covering-strip, means to affix the advance end of such strip to the bent blank, and means to revolve the form during the covering of the bent blank by said strip, a portion of said blank-bending means wiping the overlapped end of the covering-strip on to the first applied end, substantially as described.

30. In a machine of the character described, the combination of a form, means to bend a blank around such form to provide a shell with opposite open ends, means to cover the folded blank with a finishing-material projecting beyond the ends of the shell, means to remove the covered shell from the form, means to bend the edges of the finishing material over the two rear vertical edges of the shell, a plurality of stationary benders for the projecting portions of the finishing material, a shell pusher adapted to move the shell between said benders, causing the latter to fold the finishing material over the opposite open ends of the shell, plungers adapted to enter the ends of the shell to apply the finishing-material to the inner surfaces of the shell walls, and means to actuate said plungers, substantially as described.

31. In a machine of the character described, the combination of a form, means to bend a blank around said form to provide a shell with opposite open ends, means to cover the folded blank with a finishing-material projecting beyond the ends of the shell, means to remove the covered shell from the form, means to bend the edges of the finishing-material over the two rear vertical edges of the shell, a plurality of upper and lower stationary benders for the projecting portions of the finishing material, a support for the lower folders, an upper plate for the upper folders, a shell pusher adapted to move the shell between said benders, causing the latter to fold the finishing material over the opposite open ends of the shell, plungers adapted to enter the ends of the shell to apply the finishing material to the inner surfaces of the shell wall, and means to actuate said plungers substantially as described.

32. In a machine of the character described, the combination of a form, means to bend a blank around said form to provide a shell with opposite open ends, means to cover the folded blank with a finishing material projecting beyond the ends of the shell, means to remove the covered shell from the form, means to fold the edges of the finishing material over the two rear vertical edges of the shell, a plurality of upper and lower stationary benders for the projecting portions of the finishing material, a support for the lower folders, a spring-pressed upper-plate on which the upper folders are supported, a shell pusher adapted to move the shell between said benders, causing the latter to fold the finishing material over the opposite open ends of the shell, plungers adapted to enter the ends of the shell to apply the finishing material to the inner surfaces of the shell wall, and means to actuate said plungers, substantially as described.

33. In a machine of the character described, the combination of a form, means to bend a blank around said form to provide a shell with opposite open ends, means to cover the folded blank with a finishing material projecting beyond the ends of the shell, means to remove the covered shell from the form, means to bend the edges of the finishing material over the two rear vertical edges of the shell, a plurality of stationary benders for the projecting portions of the finishing-material, a shell pusher adapted to move the shell between said benders, causing the latter to fold the finishing-material over the opposite open ends of the shell, convex plungers adapted to enter the ends of the shell to apply the finishing-material to the inner surfaces of the shell walls, and means to actuate said plungers, substantially as described.

34. In a machine of the character described, the combination of a form, means to bend a blank around the form, means to feed an adhesive-coated covering-strip, means to affix the advance end of such strip to the bent blank, means to revolve the form during the covering of the blank by said strip, and means to direct an air blast toward said covering strip to prevent its being detrimentally influenced by the fanning action of the mechanical parts, substantially as described.

35. In a machine of the character described, the combination of an expansible and contractible blank magazine, means to deliver the blanks individually from the magazine, a detachable form, an expansible and contractible carrier adapted to receive the blank from the magazine and carry it into proximity to the form, adjustable folders adapted to bend the blank around the form, means to intermittently rotate the form, and adjustable means to cover the bent blank with a finishing-material during rotation of the form, substantially as described.

36. In a machine of the character described, the combination of an expansible and contractible blank magazine, means to deliver the blanks individually from the magazine, a detachable form, an expansible and contractible carrier adapted to receive the blank from the magazine and carry it into proximity to the form, folders mounted and adjustable on said carrier and adapted to bend the blank around the form, means to intermittently rotate the form, and adjustable means to cover the bent blank with a finishing-material during rotation of the form, substantially as described.

37. In a machine of the character described, the combination of an expansible and contractible blank magazine, means to deliver the blank individually from the magazine, a detachable form, an expansible and contractible carrier adapted to receive the blank from the magazine and carry it into proximity to the form, adjustable folders adapted to bend the blank around the form, means to intermittently rotate the form, a supply of finishing-material, adjustable means to cover the bent blank with such finishing-material during rotation of the form, and adjustable means to cut off the desired length of finishing-material to cover the blank, substantially as described.

MICHAEL J. MILMOE.

Witnesses:
FRED G. BROOKS,
G. J. BECKER.